(12) United States Patent
Bauer et al.

(10) Patent No.: US 10,677,354 B2
(45) Date of Patent: Jun. 9, 2020

(54) HYDRAULIC VEHICLE INCORPORATING EFFICIENT ENERGY STORAGE AND REGENERATION SYSTEM

(71) Applicant: Energy Spring Ltd., Kfar Vradim (IL)

(72) Inventors: Abraham Bauer, Hod Hasharon (IL); Yona Weiss, Misgav Dov (IL); Yoram Fruehling, Hod Hasharon (IL)

(73) Assignee: Energy Spring Ltd., Kfar Vradim (IL)

( * ) Notice: Subject to any disclaimer, the term of this patent is extended or adjusted under 35 U.S.C. 154(b) by 255 days.

(21) Appl. No.: 15/629,999

(22) Filed: Jun. 22, 2017

(65) Prior Publication Data
US 2017/0292539 A1 Oct. 12, 2017

Related U.S. Application Data

(63) Continuation-in-part of application No. 13/641,277, filed as application No. PCT/IB2011/051831 on Apr. 27, 2011, now abandoned.
(Continued)

(51) Int. Cl.
*F16H 61/4096* (2010.01)
*B60K 6/12* (2006.01)
(Continued)

(52) U.S. Cl.
CPC ........ *F16H 61/4096* (2013.01); *B60K 6/12* (2013.01); *F15B 1/024* (2013.01); *B60W 10/103* (2013.01);
(Continued)

(58) Field of Classification Search
None
See application file for complete search history.

(56) References Cited

U.S. PATENT DOCUMENTS 2,431,719 A 12/1947 Wilkin
2,539,862 A 1/1951 Rushing
(Continued)

FOREIGN PATENT DOCUMENTS

GB 2370614 A 7/2002
WO WO 2008/0106808 9/2008

OTHER PUBLICATIONS

International Search Report issued for PCT/IB2011/051831 dated Nov. 3, 2011.
(Continued)

*Primary Examiner* — F Daniel Lopez
*Assistant Examiner* — Michael Quandt
(74) *Attorney, Agent, or Firm* — Zaretesky Group PC; Howard Zaretsky

(57) ABSTRACT

An energy storage and regeneration system that converts irregular, non-constant, and variable input power to regular, constant, and controlled output power using hydraulics whereby the irregular input power is used to pump hydraulic fluid into an accumulator array where it is stored pressurized. Energy is released in a controlled fashion using a hydraulic motor operated by the pressurized hydraulic fluid from the accumulator array, in accordance with the specified power demand. One or more power units may be deployed depending on the amount of energy required at the output. Each power unit includes a hydraulic motor and associated floating accumulator whose internal pressure is controlled to maintain a substantially constant pressure differential across its associated motor. The system can be integrated into various energy system sources including renewable energy such as wind, PV or thermal solar, wave, tidal, etc. as well as various types of vehicles such as cars, trucks, motorcycles, trains, boats, etc.

19 Claims, 24 Drawing Sheets

Related U.S. Application Data

(60) Provisional application No. 61/328,746, filed on Apr. 28, 2010.

(51) Int. Cl.
*F16H 61/44* (2006.01)
*B60W 10/103* (2012.01)
*F15B 1/02* (2006.01)

(52) U.S. Cl.
CPC .. *B60W 2710/24* (2013.01); *F15B 2201/3152* (2013.01); *F16H 61/44* (2013.01); *Y02T 10/6208* (2013.01)

(56) References Cited

U.S. PATENT DOCUMENTS

| | | | |
|---|---|---|---|
| 3,672,048 A | 6/1972 | Conwell | |
| 4,076,176 A * | 2/1978 | Torrence | B02C 2/045 |
| | | | 241/30 |
| 4,348,863 A | 9/1982 | Taylor et al. | |
| 4,382,484 A | 5/1983 | Anderson | |
| 4,387,783 A | 6/1983 | Carman | |
| 4,519,752 A | 5/1985 | Valentin | |
| 4,541,241 A | 9/1985 | Schulze | |
| 4,615,257 A | 10/1986 | Valentin | |
| 4,674,280 A | 6/1987 | Stuhr | |
| 4,813,510 A | 3/1989 | Lexen | |
| 5,005,357 A | 4/1991 | Fox | |
| 6,293,231 B1 | 9/2001 | Valentin | |
| 6,406,271 B1 | 6/2002 | Valentin | |
| 6,484,674 B2 | 11/2002 | Valentin | |
| 6,748,737 B2 | 6/2004 | Lafferty | |
| 6,959,545 B2 * | 11/2005 | Lippert | B60K 6/12 |
| | | | 417/34 |
| 7,487,856 B2 | 2/2009 | Edson | |
| 7,562,944 B2 | 7/2009 | Walker | |
| 7,564,144 B1 | 7/2009 | Srybnik et al. | |
| 7,654,354 B1 | 2/2010 | Otterstrom | |
| 7,958,731 B2 | 6/2011 | McBride | |
| 9,097,240 B1 | 8/2015 | Langmann | |
| 9,874,233 B2 | 1/2018 | Yuan et al. | |
| 2009/0173066 A1 | 7/2009 | Duray | |
| 2010/0032959 A1 | 2/2010 | Nies | |
| 2010/0040470 A1 | 2/2010 | Nies et al. | |
| 2011/0252777 A1 | 10/2011 | Bollinger et al. | |
| 2013/0234433 A1 | 9/2013 | Tsutsumi | |
| 2014/0086773 A1 | 3/2014 | Valentin | |
| 2014/0202150 A1 | 7/2014 | Valentin | |

OTHER PUBLICATIONS

Written Opinion issued for PCT/IB2011/051831 dated Nov. 3, 2011.
http://www.hydraulicspneumatics.com/hydraulic-pumps-motors/hydraulic-electric- analogies-transistors-amplifiers-and-valves, May 25, 2017.
Advanced Hydrostatic Drives; Valentin Technologies LLC; http://www.valentintechnologies.com/drivetrain; undated.
Hydrostatic Locomotive; Valentin Technologies LLC; http://www.valentintechnologies.com/locomotive; undated.
Hydrostatic Wind Turbine; Valentin Technologies LLC; http://www.valentintechnologies.com/wind-turbine; undated.
Hydrostatic Marine Propulsion; Valentin Technologies LLC; http://www.valentintechnologies.com/ship; undated.
Advanced Hydrostatic Drivetrains; Valentin Technologies LLC; http://www.valentintechnologies.com/home; undated.

* cited by examiner

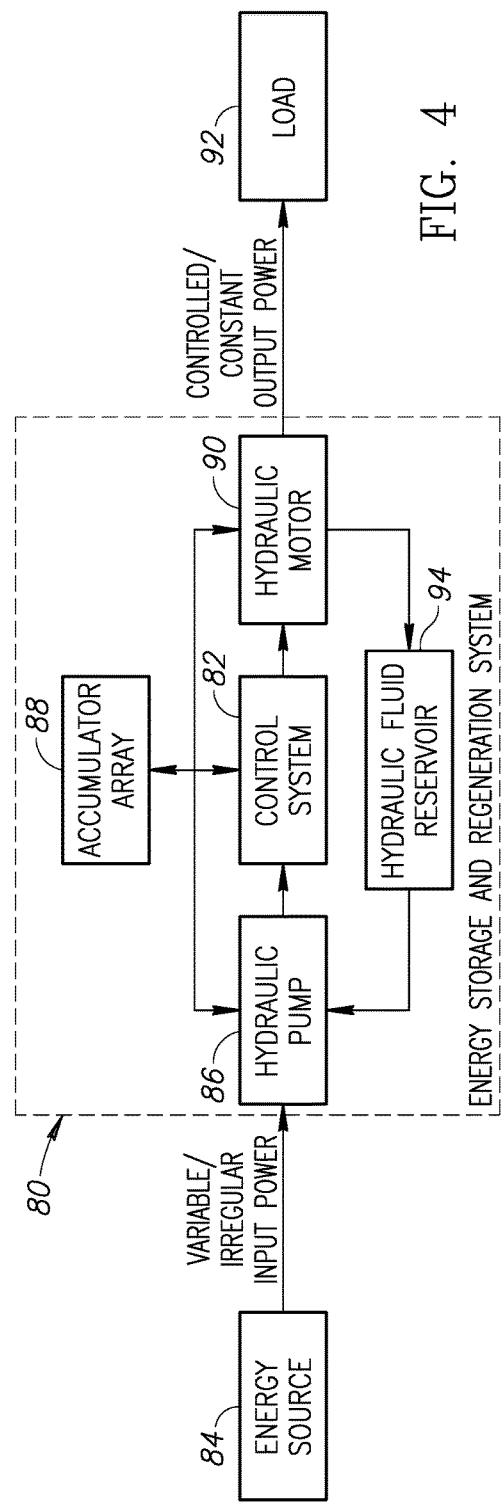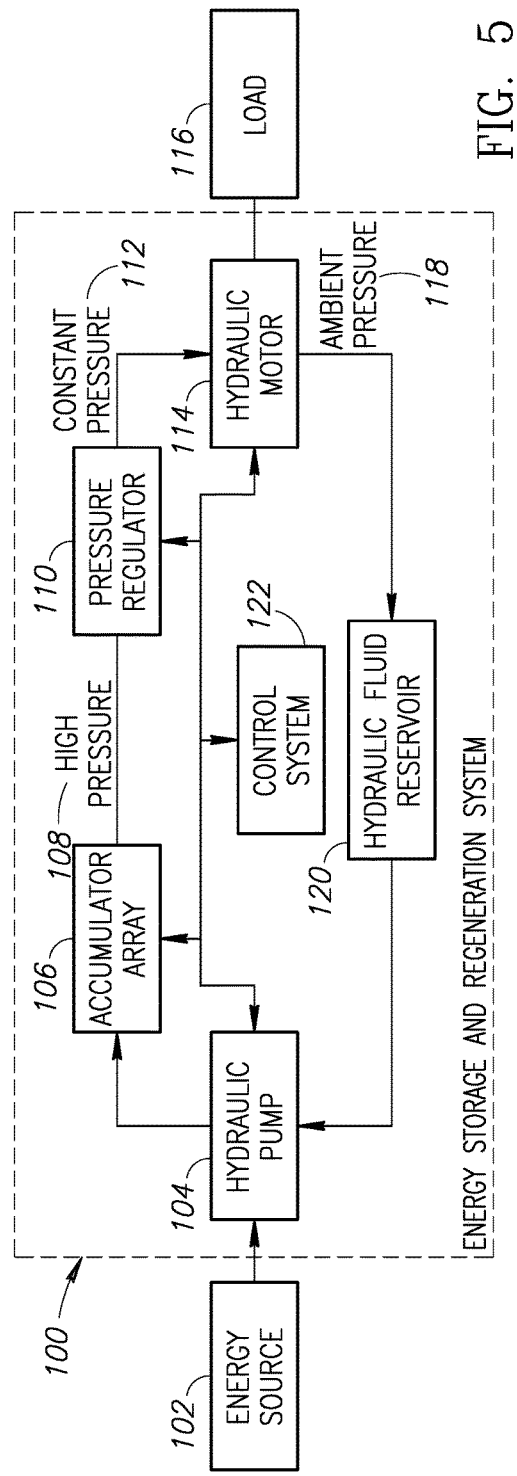

HYDRAULIC VEHICLE INCORPORATING EFFICIENT ENERGY STORAGE AND REGENERATION SYSTEM

REFERENCE TO PRIORITY APPLICATIONS

This application is a continuation in part of U.S. application Ser. No. 13/641,277, filed Nov. 29, 2012, entitled "Hydraulic Power Converter," which is a 371 of PCT/IB2011/051831, filed Apr. 27, 2011, entitled "Hydraulic Power Converter," which claims priority to U.S. Provisional Application Ser. No. 61/328,746, filed Apr. 28, 2010, entitled "Novel System for Efficient Improvement in Hybrid Vehicles," all of which are incorporated herein by reference in their entirety.

FIELD OF THE DISCLOSURE

The subject matter disclosed herein relates to the field of hydraulics and more particularly relates to vehicles incorporating an efficient system for storing and regenerating energy using hydraulics.

BACKGROUND OF THE INVENTION

Currently, the world is witnessing huge growth and development of renewable energy sources such as wind power, solar photovoltaics (PV) and thermal power, hydropower, wave and tidal power, etc. Along with the growth of renewable energy sources is the problem of matching energy generation with energy consumption and demand. For example, wind turbines only generate power when the wind is sufficiently strong. PV solar arrays only generate power when the sun is shining.

Peaks in energy demand, on the other hand, are not necessarily correlated with peaks in energy generation. In recent years, there have been efforts made to manage the electricity supply. The problem of efficiently handling irregular and non-constant energy supplies and variable demand for electricity still remains unsolved. For example, solar plants supply energy only during sunny days, and wind turbines supply power only when it is windy. Electricity demand is characterized by a peak, that requires more power stations to be built to supply the peak demand than necessary to supply the average demand.

There is thus a need for an energy system that both harnesses the irregular power generated by renewable sources as well as efficiently meets the energy demands of end users over time. In addition, there is a need for vehicles that incorporate such an energy system in order to improve the fuel efficiencies of vehicles over what is available today.

SUMMARY OF THE INVENTION

The present invention discloses several vehicles incorporating a hydraulics based efficient energy storage and regeneration system (ESRS). The ESRS system is operative to convert irregular, non-constant, and variable input power to regular, constant, and controlled output power using hydraulics whereby the irregular input power is used to pump hydraulic fluid into an accumulator array where it is stored pressurized. Energy is released in a controlled fashion using a hydraulic motor operated by the pressurized hydraulic fluid from the accumulator array, in accordance with the specified power demand. One or more power units may be deployed depending on the amount of energy required at the output. Each power unit includes a hydraulic motor and associated floating accumulator whose internal pressure is controlled to maintain a substantially constant pressure differential across its associated motor thereby providing steady output power. The system can be integrated into various energy system sources including renewable energy such as wind, PV or thermal solar, wave, tidal, etc. as well as various types of vehicles such as cars, trucks, motorcycles, trains, boats, etc.

This, additional, and/or other aspects and/or advantages of the embodiments of the present invention are set forth in the detailed description which follows; possibly inferable from the detailed description; and/or learnable by practice of the embodiments of the present invention.

There is thus provided in accordance with the invention, a hydraulic energy powered vehicle, comprising a frame, an engine mounted on the frame and operative to supply a source of mechanical energy, a hydraulic pump coupled to the source of mechanical energy, the hydraulic pump operative to convert mechanical energy output from the engine to hydraulic energy at an output thereof, an accumulator array including one or more accumulator tanks, the accumulator array coupled to the output of the hydraulic pump, the accumulator array operative to store the hydraulic energy generated by the hydraulic pump in the one or more accumulator tanks, a hydraulic motor coupled to the accumulator array and operative to convert hydraulic energy released from the accumulator array into mechanical energy, a floating accumulator coupled to the hydraulic motor, a control system coupled to the accumulator array and the floating accumulator, the control system operative to coordinate the storage and release of hydraulic energy into and out of the one or more individual accumulator tanks of the accumulator array in accordance with throttle commands from a driver, and wherein the control system is operative to control the charging and discharging of hydraulic fluid into and out of the floating accumulator such that the pressure differential across the hydraulic motor is maintained at a desired level in accordance with the throttle commands.

There is also provided in accordance with the invention, a hydraulic energy powered vehicle, comprising at least one engine operative to supply a source of mechanical energy, a hydraulic pump coupled to the source of mechanical energy, the hydraulic pump operative to convert mechanical energy output from the engine to hydraulic energy at an output thereof, an accumulator array including a plurality of accumulator tanks, the accumulator array coupled to the output of the hydraulic pump, the accumulator array operative to store the hydraulic energy generated by the hydraulic pump in the plurality of accumulator tanks, one or more power units coupled to the accumulator array and operative to convert hydraulic energy released from the accumulator array into mechanical energy, each power unit including a hydraulic motor and a floating accumulator, a control system coupled to the accumulator array and the one or more power units, the control system operative to coordinate the storage and release of hydraulic energy into and out of the individual accumulator tanks of the accumulator array and the floating accumulator in each power unit in accordance with a throttle command from a driver, and wherein the control system is operative to control the charging and discharging of hydraulic fluid into and out of the floating accumulator in each respective power unit such that the pressure differential across a power unit's corresponding hydraulic motor is maintained at a desired level in accordance with the throttle command.

There is further provided in accordance with the invention, a hydraulic energy powered vehicle, comprising a frame, a hydraulic coupler operative to temporarily connect the vehicle to a hydraulic charging station, an accumulator array mounted on the frame, the accumulator array including one or more accumulator tanks, the accumulator array coupled to the hydraulic coupler, the accumulator array operative to store hydraulic energy received from the charging station in the one or more accumulator tanks, a hydraulic motor coupled to the accumulator array and operative to convert hydraulic energy released from the accumulator array into mechanical energy, a floating accumulator coupled to the hydraulic motor, a control system coupled to the accumulator array and the floating accumulator, the control system operative to coordinate the storage of hydraulic energy from the charging station into the one or more individual accumulator tanks of the accumulator array, as well as the release of hydraulic energy out of the one or more individual accumulator tanks of the accumulator array in accordance with throttle commands from a driver, and wherein the control system is operative to control the charging and discharging of hydraulic fluid into and out of the floating accumulator such that the pressure differential across the hydraulic motor is maintained at a desired level in accordance with the throttle commands.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein:

FIG. 4 is a block diagram illustrating a first example embodiment of the energy storage and regeneration system of the present invention;

FIG. 5 is a block diagram illustrating a second example embodiment of the energy storage and regeneration system of the present invention;

DETAILED DESCRIPTION

Figure 1:
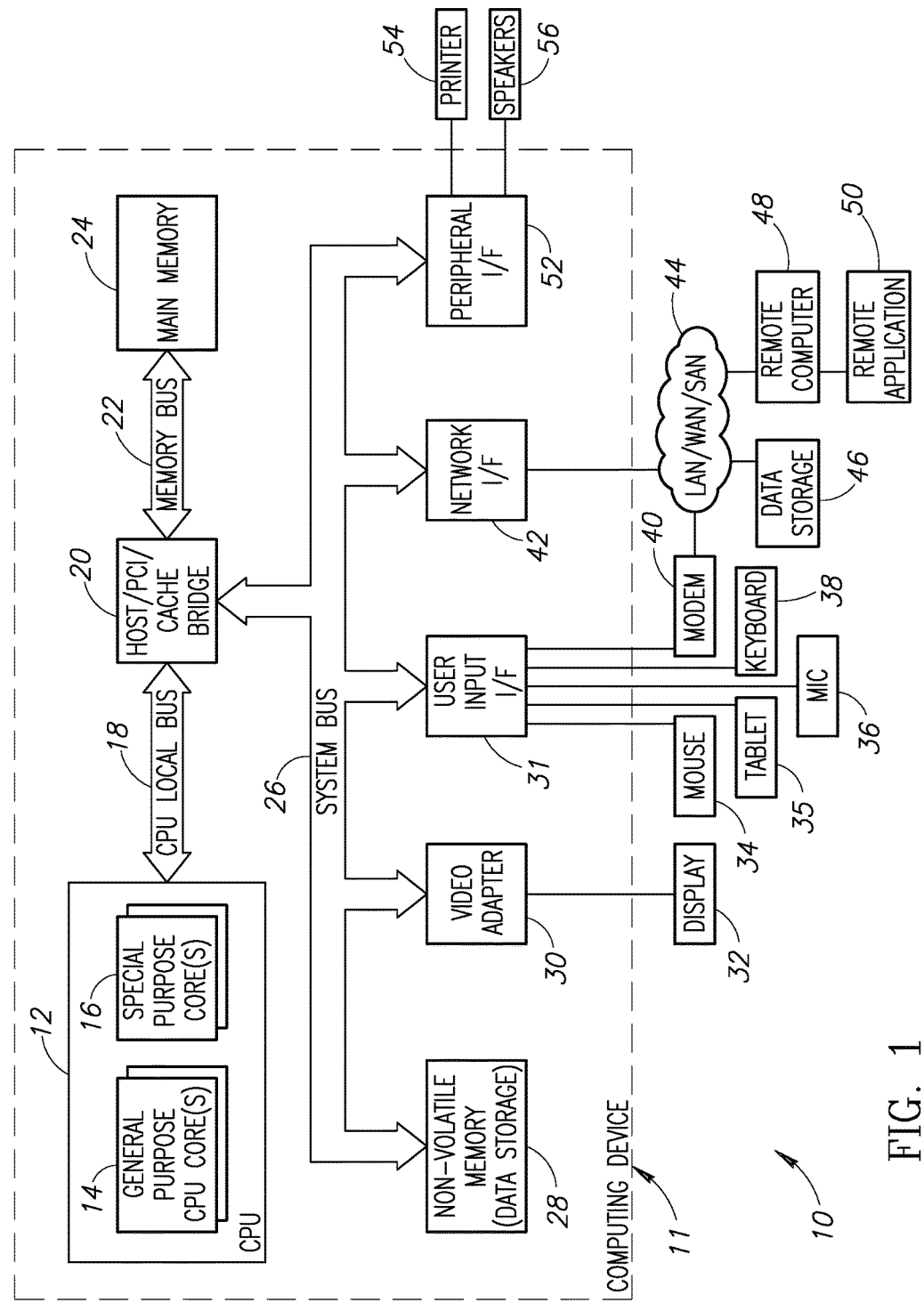
FIG. 1 is a block diagram illustrating an example computer processing system adapted to implement the control system portion of the present invention.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++, C # or the like, conventional procedural programming languages, such as the "C" programming language, and functional programming languages such as Prolog and Lisp, machine code, assembler or any other suitable programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network using any type of network protocol, including for example a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The invention is operational with numerous general purpose or special purpose computing system environments or configurations. Examples of well-known computing systems, environments, and/or configurations that may be suitable for use with the invention include, but are not limited to, personal computers, server computers, cloud computing, hand-held or laptop devices, multiprocessor systems, microprocessor, microcontroller or microcomputer based systems, set top boxes, programmable consumer electronics, ASIC or FPGA core, DSP core, network PCs, minicomputers, mainframe computers, distributed computing environments that include any of the above systems or devices, and the like.

In addition, the invention is operational in systems incorporating sensors such as found in automated factories, in mobile devices such as tablets and smartphones, smart meters installed in the power grid and control systems for robot networks. In general, any computation device that can host an agent can be used to implement the present invention.

A block diagram illustrating an example computer processing system adapted to implement the control system portion of the present invention is shown in FIG. 1. The exemplary computer processing system, generally referenced 10, for implementing the invention comprises a general purpose computing device 11. Computing device 11 comprises central processing unit (CPU) 12, host/PIC/cache bridge 20 and main memory 24.

The CPU 12 comprises one or more general purpose CPU cores 14 and optionally one or more special purpose cores 16 (e.g., DSP core, floating point, etc.). The one or more general purpose cores execute general purpose opcodes while the special purpose cores execute functions specific to their purpose. The CPU 12 is coupled through the CPU local bus 18 to a host/PCI/cache bridge or chipset 20. A second level (i.e. L2) cache memory (not shown) may be coupled to a cache controller in the chipset. For some processors, the external cache may comprise an L1 or first level cache. The bridge or chipset 20 couples to main memory 24 via memory bus 20. The main memory comprises dynamic random access memory (DRAM) or extended data out (EDO) memory, or other types of memory such as ROM, static RAM, flash, and non-volatile static random access memory (NVSRAM), bubble memory, etc.

The computing device 11 also comprises various system components coupled to the CPU via system bus 26 (e.g., PCI). The host/PCI/cache bridge or chipset 20 interfaces to the system bus 26, such as peripheral component interconnect (PCI) bus. The system bus 26 may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

Various components connected to the system bus include, but are not limited to, non-volatile memory (e.g., disk based data storage) 28, video/graphics adapter 30 connected to display 32, user input interface (I/F) controller 31 connected to one or more input devices such mouse 34, tablet 35, microphone 36, keyboard 38 and modem 40, network interface controller 42, peripheral interface controller 52 connected to one or more external peripherals such as printer 54 and speakers 56. The network interface controller 42 is coupled to one or more devices, such as data storage 46, remote computer 48 running one or more remote applications 50, via a network 44 which may comprise the Internet cloud, a local area network (LAN), wide area network (WAN), storage area network (SAN), etc. A small computer systems interface (SCSI) adapter (not shown) may also be coupled to the system bus. The SCSI adapter can couple to various SCSI devices such as a CD-ROM drive, tape drive, etc.

The non-volatile memory 28 may include various removable/non-removable, volatile/nonvolatile computer storage media, such as hard disk drives that reads from or writes to non-removable, nonvolatile magnetic media, a magnetic disk drive that reads from or writes to a removable, non-volatile magnetic disk, an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

A user may enter commands and information into the computer through input devices connected to the user input interface 31. Examples of input devices include a keyboard and pointing device, mouse, trackball or touch pad. Other input devices may include a microphone, joystick, game pad, satellite dish, scanner, etc.

The computer 11 may operate in a networked environment via connections to one or more remote computers, such as a remote computer 48. The remote computer may comprise a personal computer (PC), server, router, network PC, peer device or other common network node, and typically includes many or all of the elements described supra. Such networking environments are commonplace in offices, enterprise-wide computer networks, intranets and the Internet.

When used in a LAN networking environment, the computer 11 is connected to the LAN 44 via network interface 42. When used in a WAN networking environment, the computer 11 includes a modem 40 or other means for establishing communications over the WAN, such as the Internet. The modem 40, which may be internal or external, is connected to the system bus 26 via user input interface 31, or other appropriate mechanism.

The computing system environment, generally referenced 10, is an example of a suitable computing environment and is not intended to suggest any limitation as to the scope of use or functionality of the invention. Neither should the computing environment be interpreted as having any dependency or requirement relating to any one or combination of components illustrated in the exemplary operating environment.

In one embodiment, the software adapted to implement the system and methods of the present invention can also reside in the cloud. Cloud computing provides computation, software, data access and storage services that do not require end-user knowledge of the physical location and configuration of the system that delivers the services. Cloud computing encompasses any subscription-based or pay-per-use service and typically involves provisioning of dynamically scalable and often virtualized resources. Cloud computing providers deliver applications via the internet, which can be accessed from a web browser, while the business software and data are stored on servers at a remote location.

In another embodiment, software adapted to implement the system and methods of the present invention is adapted to reside on a computer readable medium. Computer readable media can be any available media that can be accessed by the computer and capable of storing for later reading by a computer a computer program implementing the method of this invention. Computer readable media includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Communication media typically embodies computer readable instructions, data structures, program modules or other data such as a magnetic disk within a disk drive unit. The software adapted to implement the system and methods of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the system and methods of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk, CDROM, DVD, flash memory, portable hard disk drive, etc. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

Figure 2:
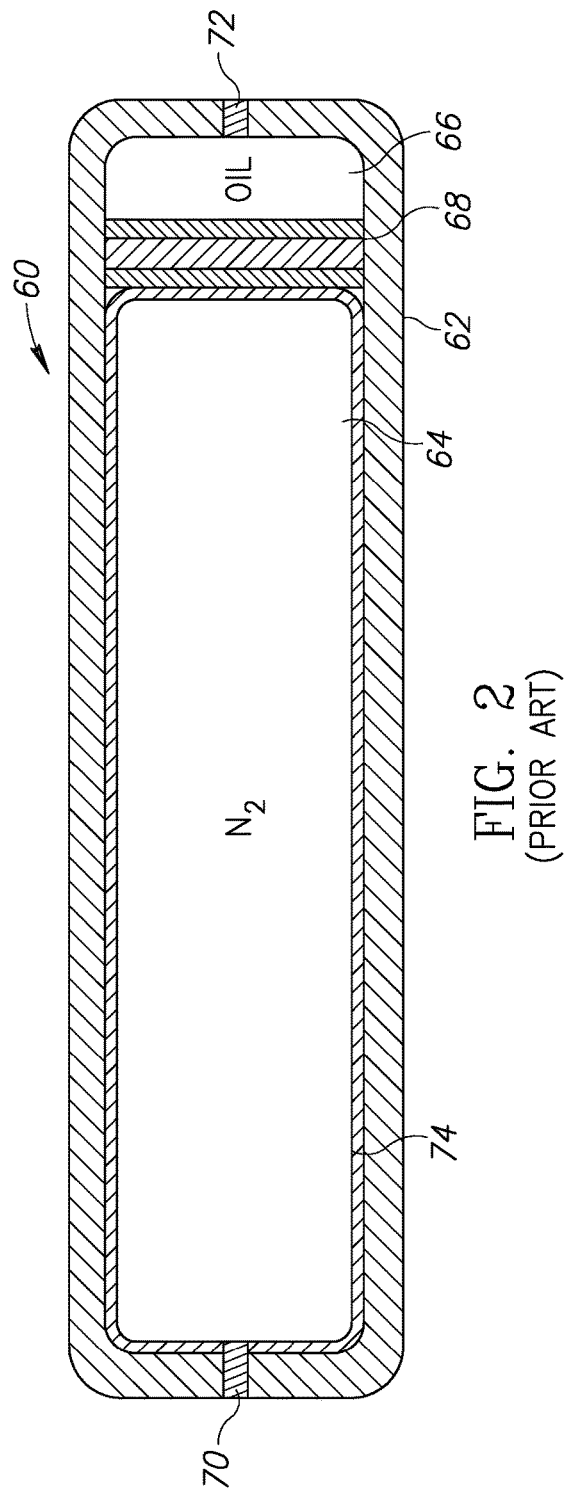
FIG. 2 is a diagram illustrating an example prior art accumulator in an empty state.
Figure 3:
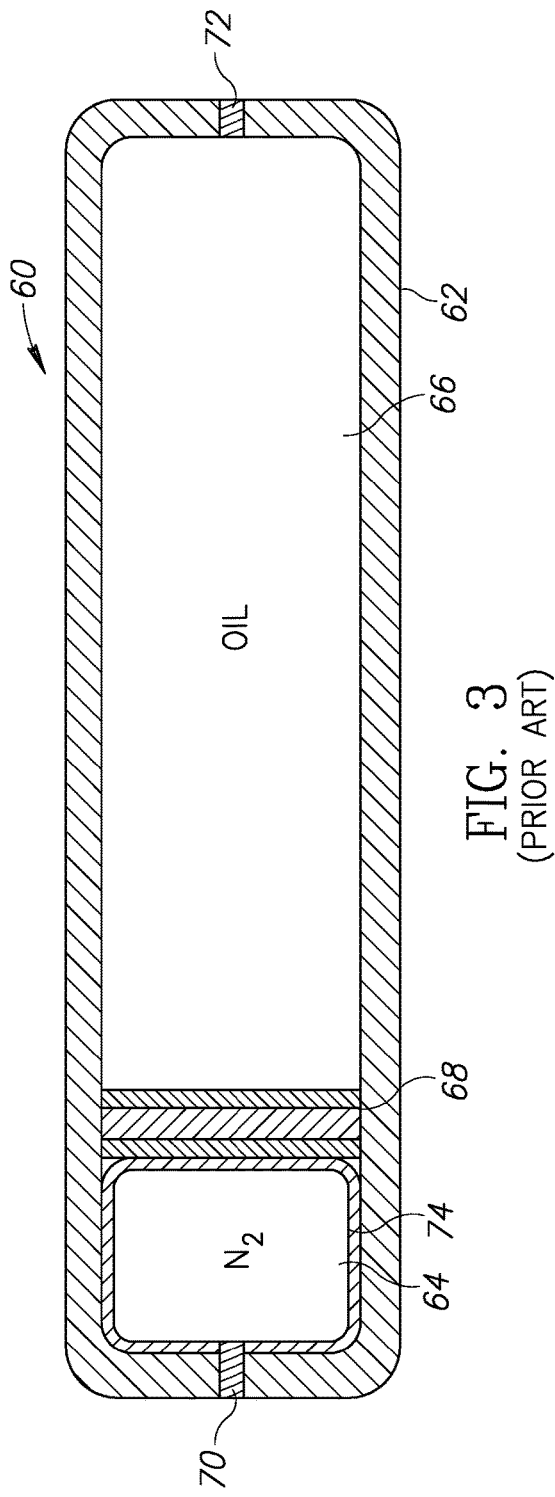
FIG. 3 is a diagram illustrating an example prior art accumulator in a full state.

A diagram illustrating an example prior art accumulator in an empty state is shown in FIG. 2. A diagram illustrating an example prior art accumulator in a full state is shown in FIG. 3. The accumulator, generally referenced 60, comprises a tank 62 constructed from a suitable material, e.g., steel, to contain high pressures, a piston 68, a bladder 74 containing a gas such as nitrogen 64 and opening 70. In operation, pressurized oil 66, i.e. hydraulic fluid, is pumped into the accumulator through opening 72 and pushes against the piston 68. Due to the pressure, the piston moves to compress the gas bladder 74. Since gas is compressible, the bladder is compressed to a smaller and smaller size as more and more pressured oil is pumped into the accumulator.

FIG. 2 shows the accumulator in a near empty state. The gas bladder 74 is expanded to comprise the majority of the internal space. FIG. 3 shows the accumulator in an almost full state where the gas bladder 74 is compressed to occupy a small portion of the internal space. In this state, the majority of the internal space is taken up by the oil 66. Thus, the bladder 74 of gas 64 expands in accordance with pressurized oil entering the accumulator as well as contracts as pressurized oil is released from the accumulator.

A block diagram illustrating a first example embodiment of the energy storage and regeneration system of the present invention is shown in FIG. 4. The energy storage and regeneration system (ESRS), generally referenced 80, comprises a hydraulic pump 86 coupled to a source of energy 84, accumulator array 88, hydraulic motor 90 coupled to a load 92, hydraulic fluid reservoir 94, and control system 82.

In operation, the ESRS 80 receives variable, irregular, discontinuous power from an energy source 84 and delivers controlled, constant power to a load 92. The hydraulic pump 86 is configured to receive the irregular power from source 84 and use it to pump hydraulic fluid from the reservoir 94 to the accumulator array 88. The accumulator array comprises a plurality of accumulator tanks such as shown in FIGS. 1 and 2 connected in tandem where each individual accumulator is configured to receive, store and supply hydraulic pressure independently of the other accumulators, i.e. each accumulator can be pressurized to different pressure levels. Thus, each accumulator tank can operate independently and in an isolated manner from all the other accumulator tanks.

Pressurized oil stored in the accumulator array is released to power the hydraulic motor 90. The motor can supply mechanical energy to the load 92 which may comprise an electric generator or any other suitable device. In one embodiment, pressurized oil is released from the accumulator array so as to maintain a constant pressure differential across the motor 90. This enables steady constant output power to be provided. The control system 82 is operative to control the various elements of the ESRS including the pump 86, the flow of oil into and out of the individual accumulator tanks in the accumulator array 88, and the motor 90 such that the motor delivers substantially constant output power. The output power delivered by the motor can be varied via the control system in accordance with the particular energy demand at any point in time.

A block diagram illustrating a second example embodiment of the energy storage and regeneration system of the present invention is shown in FIG. 5. The ESRS, generally referenced 100, comprises a hydraulic pump 104 coupled to an energy source 102, accumulator array 106, pressure regulator 110, hydraulic motor 114 coupled to a load 116, hydraulic fluid reservoir 120, and control system 122.

As in the first embodiment, variable, irregular input power 102 is converted by the motor to pressurized oil which is stored in the accumulator array 106. In this second embodiment, high pressure 108 from the accumulator array is released in a controlled manner via the control system to the pressure regulator 110. The pressure regulator generates a constant pressure 112 at its output which is used to drive motor 114 which powers the load 116. The oil output of the motor is at substantially ambient pressure 118 and collects in the reservoir 120 where it is fed to the pump 104 to complete the cycle.

Figure 6:
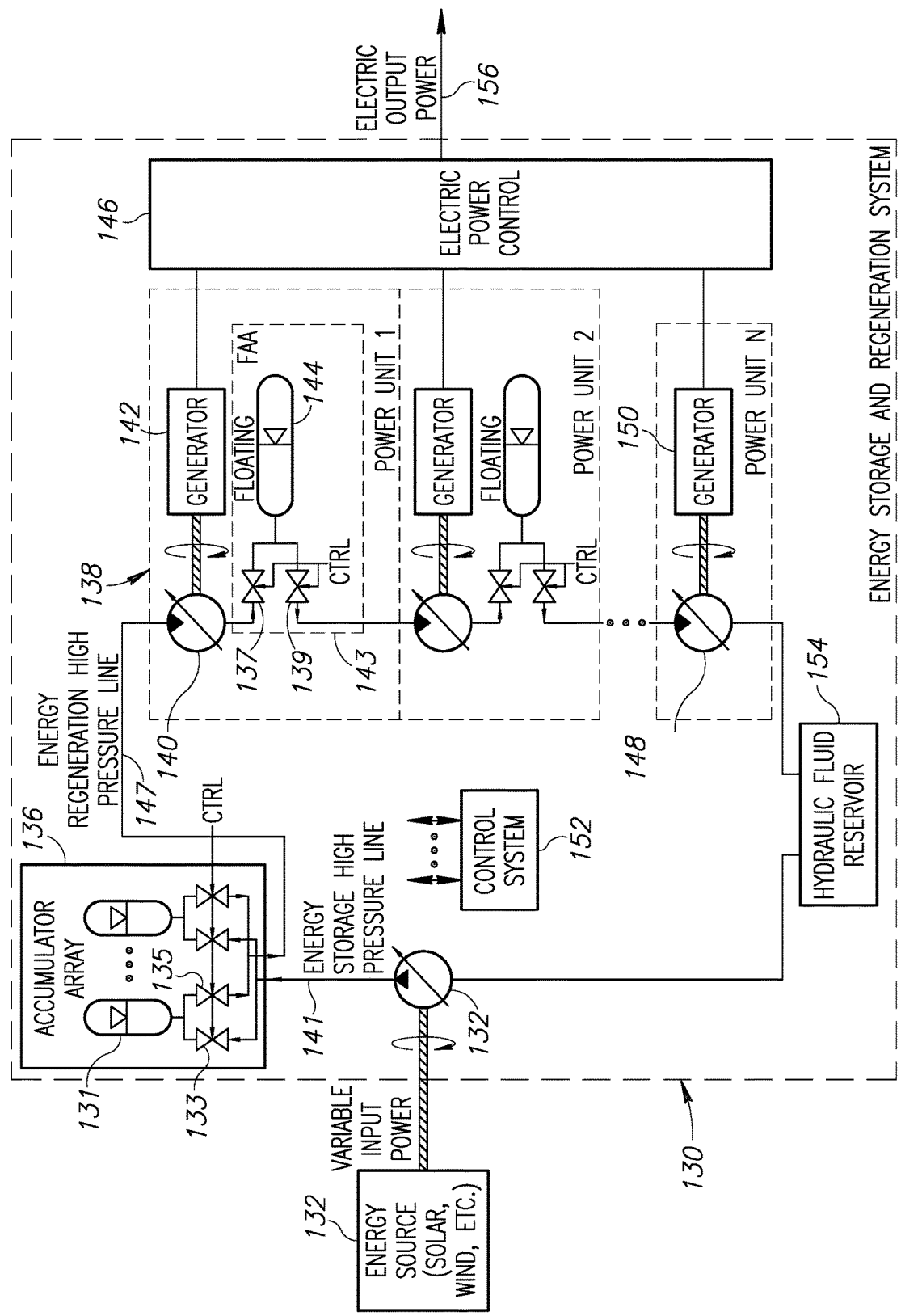
FIG. 6 is a block diagram illustrating a third example embodiment of the energy storage and regeneration system of the present invention.

A block diagram illustrating a third example embodiment of the energy storage and regeneration system of the present invention is shown in FIG. 6. For illustration purposes only, this embodiment uses the ESRS in an electricity generating application. It is appreciated that the mechanical energy output by the system can be used in any desired fashion depending on the particular application and is not limited to the electricity application described herein.

The ESRS, generally referenced 130, comprises pump 134 coupled to an energy source 132, accumulator array 136, one or more power units 138, electric power control block 146, control system 152, and optional hydraulic fluid reservoir 154. The accumulator array 136 comprises a plurality of N accumulators 131, each having an input valve 133 connected to energy storage high pressure line 141 and an output valve 135 connected to energy regeneration high pressure line 147. The M power units 138 (where M is a positive integer) are connected sequentially in tandem with each unit comprising a hydraulic motor 140, and a floating accumulator assembly (FAA) 143. The motor 140 is coupled to an electric generator 142 for converting the mechanical energy converted by the motor into electrical energy. The outputs of the M generators are input to an electric power control circuit 146 which combines and regulates the electricity from the generators to produce electric output power 156 which is supplied to a utility or directly to end users.

Note that the energy source 132 may comprise any available source of energy, e.g., wind, solar PV or thermal, hydro, geothermal, electrical, etc. Ultimately, it is converted to mechanical energy to turn the shaft of the hydraulic pump 134. Therefore, depending on the energy source, energy conversion may be required. For example, consider a PV solar energy source. The electricity generated is first input to an electric motor whose mechanical output is then coupled to the shaft of the hydraulic pump.

The floating accumulator assembly in each power unit is configured and controlled so as to maintain a substantially constant pressure differential (or delta P) across it's respective motor. Providing a constant pressure differential across each of the motors allows the system to generate steady, constant output power. The pressures in the different floating accumulators are constantly being adjusted so that the pressure drop across the motors is maintained at a substantially constant level. Note that the $M^{th}$ power unit does not have a floating accumulator as there is no motor in a downstream power unit that requires pressure regulation. The oil output of the motor in the last power unit returns to the optional reservoir 154 or is cycled directly back to the pump 134.

Note that there is at least one floating accumulator assembly (FAA) 143 in the system 130 connected serially to hydraulic motor 140 and arranged to control the pressure across a respective motor. Each FAA 143 comprises an accumulator 144 coupled to an input valve 137 connected to the output port of the corresponding upstream motor and an output valve 139 coupled to the input port of the corresponding downstream motor. This is achieved by storing pressurized hydraulic fluid output from the motor. Increasing the pressure in the floating accumulator causes the pressure drop across the motor to decrease. On the other hand, lowering the pressure in the floating accumulator causes the pressure drop across the motor to increase. In this manner, the pressure drop across the motor can be kept fairly constant. Using floating accumulators allows adjusting the pressure level across each motor to provide a desired power to the load, and also to minimize heat loss and waste of hydraulic pressure across the motors. Additionally, determining the hydraulic pressure across hydraulic motors 140 allows controlling the provided output power.

Note also that the floating accumulator assemblies 143 may comprise floating accumulator clusters arranged to temporarily store a particular amount of pressurized hydraulic fluid. After storing the pressurized hydraulic fluid, floating accumulator assemblies 143 are operative to (1) set the back pressure across its upstream motor, and (2) provide their stored power to downstream hydraulic motors in accordance with control outputs generated by control system 152.

In one embodiment, the ESRS is configured to maintain variable pressure levels in the accumulator tanks via the control valves arranged to regulate the pressure level in each respective accumulator tank. Separate control over each accumulator tank allows the system to attain a high pressure level with a relatively small amount of hydraulic fluid. The valves are controlled by the control system over one or more communication signal links.

Thus, power from the irregular energy input source 132 is separated from the generation of controlled, steady output power 156 by the storage of hydraulic energy. For example, power storage may take place during the night and power generation during the day.

The control system is configured to receive signals from a plurality of sensors in the system (not shown for clarity). The sensors measure pressures in various parts of the system including, for example, the accumulators, floating accumulators, input and output manifolds, across the motors, pump input and output, etc. The control system is also configured to generate the control signals (e.g., electric, mechanical, pneumatic, hydraulic, etc.) that control the valves, actuators, pumps, motors, etc. in the system. One or more algorithms performed by control system are operative to receive sensor data, user commends, etc. and based thereon to generate the necessary output control signals to maintain a substantially constant pressure differential across the motors in each of the power units.

Figure 7:
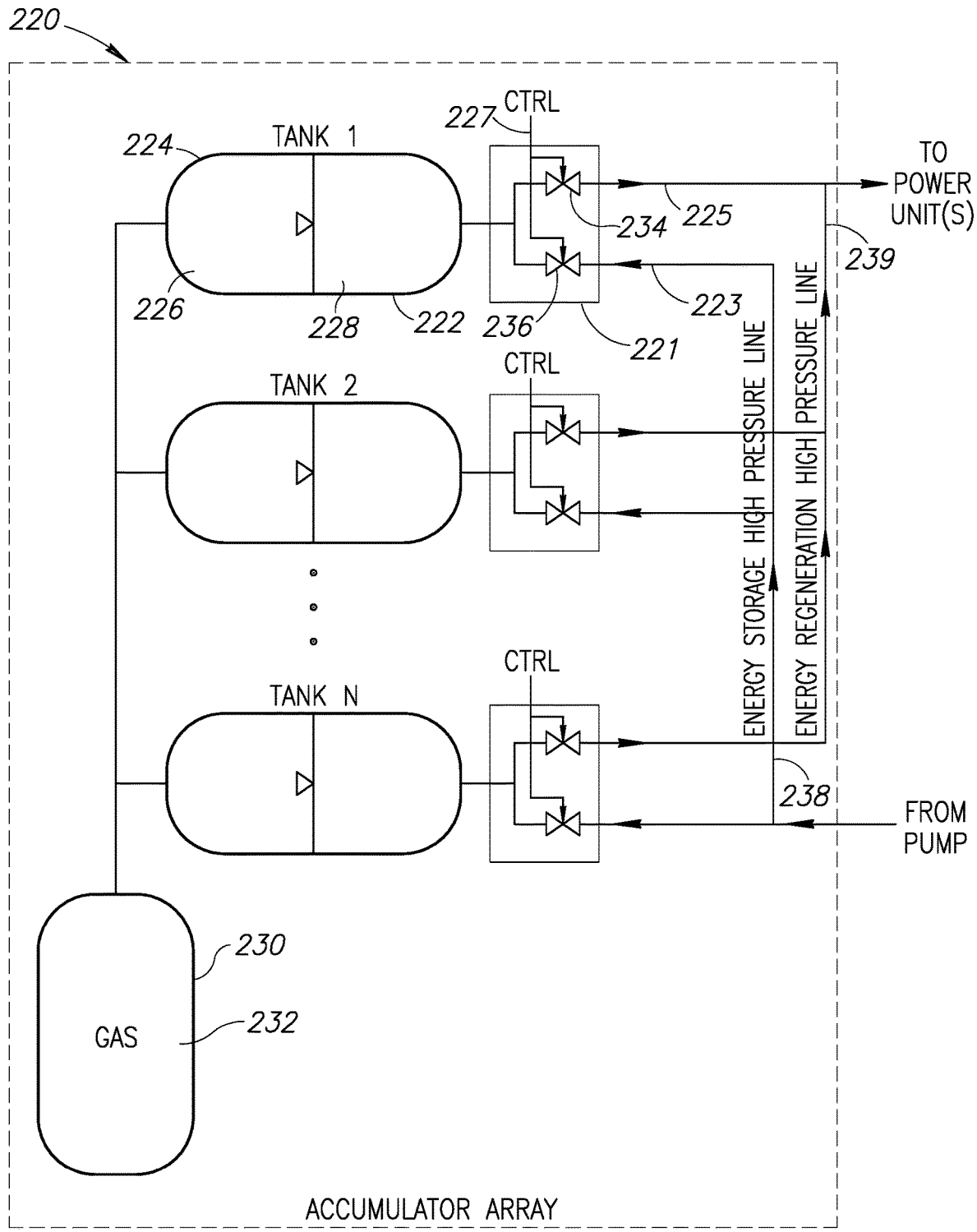
FIG. 7 is a diagram illustrating an example accumulator array in more detail.

A diagram illustrating an example accumulator array in more detail is shown in FIG. 7. In one embodiment, the accumulator array 220 comprises a plurality of N individual accumulator tanks 222 (where N is a positive integer), each comprising a bladder 224 filled with a gas 226 such as nitrogen, oil 228, and a valve manifold 221 for letting pressurized oil in 223 and out 225 which is controlled via one or more control signals 227 provided by the control system. The valve manifold 221 comprises an input valve 236 connected to the energy storage high pressure line 238 and an output valve 234 connected to the energy regeneration high pressure line 239. The inputs 223 of all the individual accumulators are coupled together and connected to the pump. The outputs 225 of all the individual accumulators are coupled together and connected to the motor in the first power unit.

An external tank 230 filled with gas 232, e.g., nitrogen, is connected in parallel to the bladders 224 of the accumulators in the array. Preferably, the volume of the external tank 230 is substantially larger than the size of the bladder in each of the individual accumulators. This functions to greatly increase the dynamic range of pressures each individual accumulator can handle. Note that the use of an external large gas tank 230 is not required but may be used to increase the efficiency of the ESRS.

Note that the gas bladders in the floating accumulators may also be connected to a shared external gas tank in similar fashion to the accumulator tanks of the accumulator array. The large external gas tank 230 may be shared between all or a portion of the accumulator tanks and floating accumulator tanks. In an alternative embodiment, the floating accumulators may share their own external gas tank (not shown) separate from external gas tank 230.

Each accumulator tank (including the floating accumulator tanks) comprises at least five parts: (1) container, (2) gas (e.g., nitrogen) bladder, (3) piston, (4) input valve, and (5) output valve. In order to maximize the energy stored by the nitrogen it is pre-pressurized to the working pressure of the hydraulic motor, this way all the oil contained in the accumulator can run the hydraulic motor. All energy storage is contained in the gas when the oil, as uncompressible media, presses the nitrogen bladder to its maximum pressure.

Since nitrogen above 33 bar cannot be treated as an ideal gas, one must use the nitrogen thermodynamic properties at each state in the accumulator in accordance with Table 1 below.

TABLE 1

Nitrogen gas thermodynamic properties (from the Nitrogen Database).

| Pressure, [bar] | 100 | 500 |
|---|---|---|
| Temperature, [deg C.] | 27 | 41 |
| phase: Supercritical Liquid, SL | SL | SL |
| Density, [kg/m^3] | 111.7 | 395.2 |
| Specific heat Cp, [KJ/(kg K)] | 0.03347 | 0.03786 |
| Specific heat Cv, [KJ/(kg K] | 0.02179 | 0.02362 |
| Entropy J/(mol K) | 151.8 | 136.7 |
| Entropy KJ/(Kg K), s | 5.42 | 4.88 |
| Enthalpy, [kJ/mol] | 8.183 | 8.185 |

TABLE 1-continued

Nitrogen gas thermodynamic properties (from the Nitrogen Database).

| Enthalpy, [kJ/Kg], h | 292.11 | 292.18 |
|---|---|---|
| internal energy, [kJ/mol] | 202.6 | 165.7 |
| internal energy, [kJ/Kg], u | 7,232.25 | 5,915.03 |

As an example, consider the pre-pressurized state to be 100 bar and the pressure in the accumulator when full is 500 bar. In an initial state i, the entire accumulator tank is filled with gas at 100 bar and 27° C. (see FIG. 2) In a final state f the accumulator tank contains oil and compressed gas, with the same weight, at 500 bar and 41° C. (see FIG. 3).

Knowing the initial conditions of the gas defines the gas mass that does not change the entire process. From the first law of thermodynamics, the work done by the oil on the gas can be calculated.

$$\Delta U = Q + W \qquad (1)$$

Where $\Delta U$ is the change in internal energy, Q is the heat exchanged with the gas, and W is the work done by the oil on the gas.

Designing the accumulator tank in a way whereby minimal heat is exchanged between the gas and its boarders will define the stored energy, i.e. work W, as the change in internal energy where $Q=\Delta H=0$. Knowing the final state where gas is compressed to the highest pressure, the volume the gas takes up is defined and the amount of oil contained in the accumulator can be calculated.

Figure 8A:
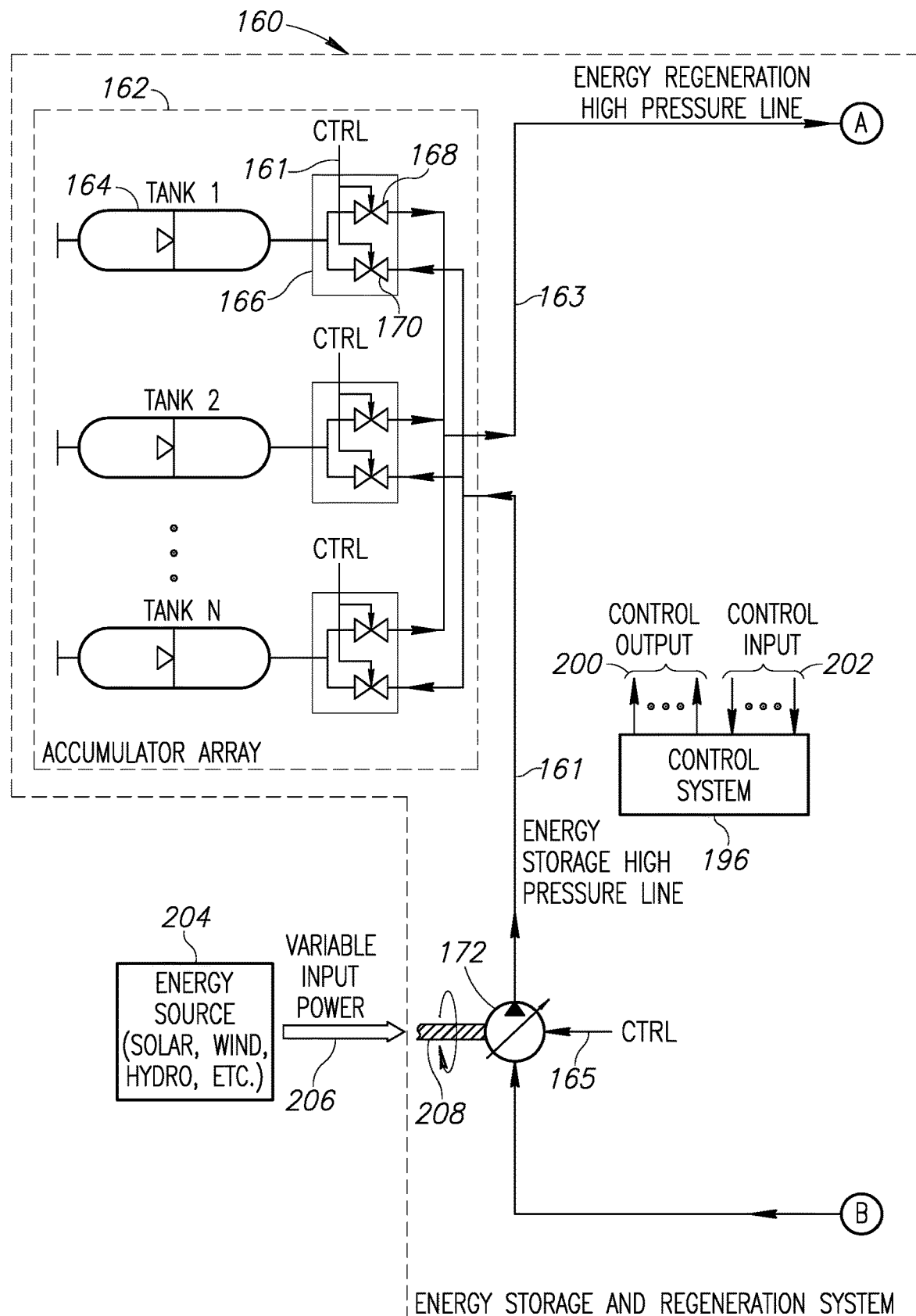
FIGS. 8A and 8B are a block diagram illustrating a fourth example embodiment of the energy storage and regeneration system of the present invention.
Figure 8B:
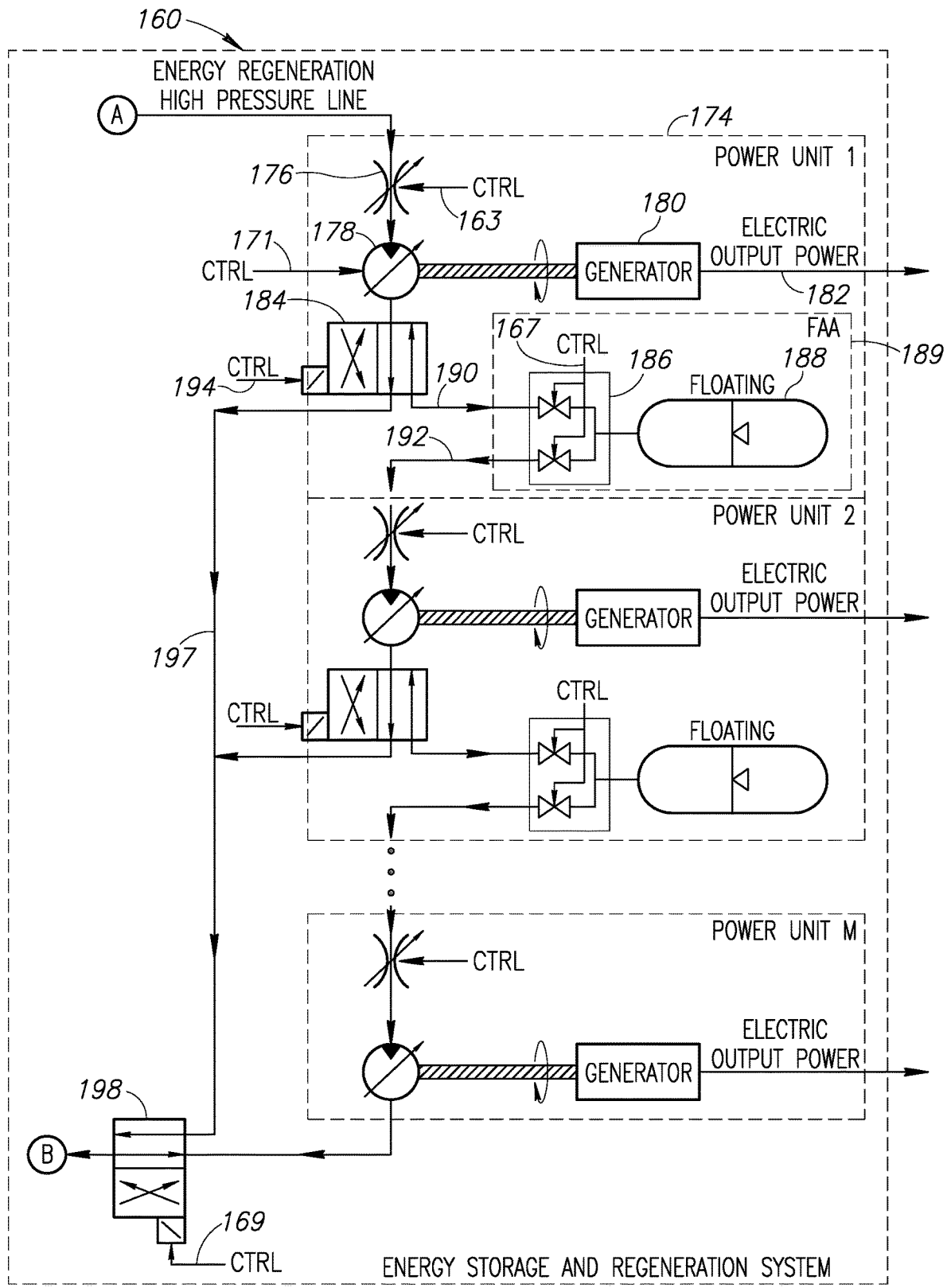

A block diagram illustrating a fourth example embodiment of the energy storage and regeneration system of the present invention is shown in FIGS. 8A and 8B. The ESRS, generally referenced 160, comprises a hydraulic pump 172, accumulator array 162, one or more power units 174 arranged sequentially one after the other, a selector 198, and control system 196. Each of the power units 1 through M comprises a proportional valve, hydraulic motor 178, generator 180 (for electricity generation application), hydraulic selector 184, floating accumulator assembly 189 and controlled manifold 186. Note that the last power unit in the chain (i.e. the $M^{th}$ unit) does not have a selector or a floating accumulator assembly since these are not needed as it is not connected to any further downstream power units.

As in the embodiment described supra, the variable input power 206 generated by the energy source 204, e.g., wind, solar, hydro, etc. is coupled to the shaft 208 of the pump 172. The pressurized fluid output of the pump is directed to the accumulator array 162. The accumulator array, described in more detail in connection with FIG. 7, comprises a plurality of individual accumulators 1 through N. Each having a control manifold 166 at one end. Both input 170 and output 168 valves are used to control fluid entering and exiting each accumulator. The input valve 170 valve is connected to the energy storage high pressure line 161 and the output valve 168 is connected to the energy regeneration high pressure line 163. When the input energy source is available, the control system controls the manifolds on the accumulator such that fluid is allowed to enter one or more of the individual accumulators. The internal pressures of all the tanks in the accumulator array is constantly monitored by the control system. Based on other sensor readings, the system state and desired power output, the control system generates the appropriate control signals to optimally maintain the pressure in each tank in the array.

When stored hydraulic energy is to be released and converted into mechanical (or electrical energy, for example), the control system opens one or more output valves 168 on the tanks in the array. The released pressured fluid is directed to power unit 1. The fluid enters a proportional valve 176.

A proportioning valve is a valve that supplies a reduced pressure to an output line. Proportional valves are used to vary either flow or pressure to reduce lunge and shock. The solenoids on these valves shift the spool more or less. According to the voltage applied to proportional solenoids, they can change the speed at which the spool shifts or the distance that it travels. Because the spool in a proportional valve does not shift all the way, all at once, the valves control the acceleration and deceleration of an actuator. Usually, varying shifting time of the spool controls acceleration and deceleration. Varying voltage to the coil limits spool travel to control the maximum speed of an actuator. The control system generates the appropriate variable electric signals.

The output of the proportional valve is input to the motor 178. The motor produces useful mechanical work, e.g., to drive a generator 180 to produce electric output power 182. The output of the motor is input to a selector 184 which can steer fluid to selector 198 for return to the pump 172 or to the input valve 190 of manifold 186, in accordance with a control signal 194. The manifold 186 is connected to the floating accumulator 188. The output valve 192 feeds the proportional valve in the downstream power unit. One or more control signals 167 from the control system 196 control the opening and closing of the input and output valves as well as the proportional valve and selector components.

Note that the selectors may switch the oil flow completely between the two outputs or are variable in that a different proportion of oil may be directed to both outputs simultaneously, 25% to port A, 75% to port B.

The function of the floating accumulator assembly is to aid in maintaining a constant pressure drop across each of the motors in the chain of power units. The input and output valves of the manifold connected to each floating accumulator are manipulated and controlled along with the release of hydraulic energy from the accumulator array to maintain a substantially constant pressure drop across each motor. A constant pressure drop across each motor is desirable in order to maintain a fairly constant output power. In this fashion, a variable, sporadic input energy source is converted to steady output power by converting the input energy into hydraulic energy, storing this hydraulic energy in the accumulator array and the floating accumulators, and converting the stored energy to mechanical or electrical energy on a steady, constant basis in accordance with user or customer demand.

A description of the full circuit path the oil takes will now be provided starting with the energy entering the system. Energy from a source 204 enters the ESRS as motion (i.e. rotation). The source can be, for example, a windmill or electrical motor based on a solar field or electrical net. The motion entering the system is coupled to the shaft 208 of a hydraulic pump which is operative to press the oil fed to the pump into different pressures. The hydraulic pump raises the oil pressure and the high pressure oil is stored in the accumulator array according to the control system control signals. The signals are generated by one or more algorithms tailored to the particular energy scenario, e.g., wind, solar, sea waves, etc. In case of a wind turbine, for example, the energy, in motion form, is probably not uniform or constant. Energy from a solar panel field enters via an electrical motor and energy from waves likely enters as hydraulic energy in the form of pressurized oil. As described supra, the control system receives data, e.g., sensor, external data, feedback signals, etc., and in response sends instruction to the various components connected to it. For example, the control system sends a control signal to each accumulator in the array as well as the floating accumulators in the power units to either accept or discharge oil via the electric valves that connect the accumulators to an oil manifold. A pressure sensor is connected to each accumulator that sends a signal with the pressure to the control system. If the pressure is not at the highest level possible, i.e. the accumulator is not full, the control system directs oil to that accumulator. A similar method applies for discharging the accumulators. The control system will direct an accumulator to discharge its oil if it is full or has sufficient pressure for the particular needs at that point in time.

When all accumulators are full or when the control system determines that energy should be released, the control system opens the release valve associated with a specific accumulator, and high pressure oil is sent to the hydraulic motor in power unit 1 that rotates the generator to generate electricity.

Note that the control system is suitably programmed to discharge oil in accordance with the demand for electricity generation. This demand can be influenced by price, i.e. the particular tariff in place at the time, or by a shortage of electricity. Another criterion considered by the control system is the availability of energy coming into the system. For example, if the system is fully loaded, i.e. all accumulators are full, the system discharges oil and generates electricity even at a low tariff but maintains the accumulators in a full state in the event the input energy drops or ceases completely and/or the tariff increases, i.e. the sale of electricity is more profitable.

This process takes place in parallel with all accumulators, i.e. array and floating, in the system. The charging and discharging of all accumulator is under the supervision and control of the control system. The accumulators in the system (array and floating) are connected to a manifold with different valves for charging and discharging. When one or more accumulators are discharging, the other accumulators can be charging since the oil discharge path is separate from the oil charge path.

The oil exiting the hydraulic motor enters the floating accumulator assembly via its corresponding selector to create a back load (i.e. back pressure) so only the desired pressure drop occurs across the motor and to enable the generation of electricity via the generator. If the electric power generated is sufficient for the particular demand, then there is no need to operate additional hydraulic motors in downstream power units. In this case, the pressurized oil is discharged back to the hydraulic pump via selector(s) 198 installed along the discharge path 197. Note that all selectors in the system are controlled by the control system 196.

A cycle ends when pressurized oil reaches the pump either to raise its pressure and store energy or to enter an accumulator tank to be stored with the same pressure from the discharge path if there is no input energy supplied to the system at that point in time. Note that all pressurized oil movement is controlled by the control system 196 via the selectors and electrical valves that open and close the accumulator tanks.

The control system is operative to input a plurality of control input signals 202 from various sensing devices in the ESRS (not shown for clarity), such as pressure sensors, flow sensors, position sensors, switches, potentiometers, photoelectrics, digital encoders, strain gauges, thermocouples, accelerometers, microelectromechanical systems (MEMS), gauges, etc. In addition, the control system is operative to generate a plurality of control output signals 200 for controlling the active components in the system, such as input and output valves, proportional valves, selectors, linear and nonlinear actuators, cylinders, pumps, ac and dc motors, voice coils, servo motors, hydraulics, pneumatics, etc.

Figure 9A:
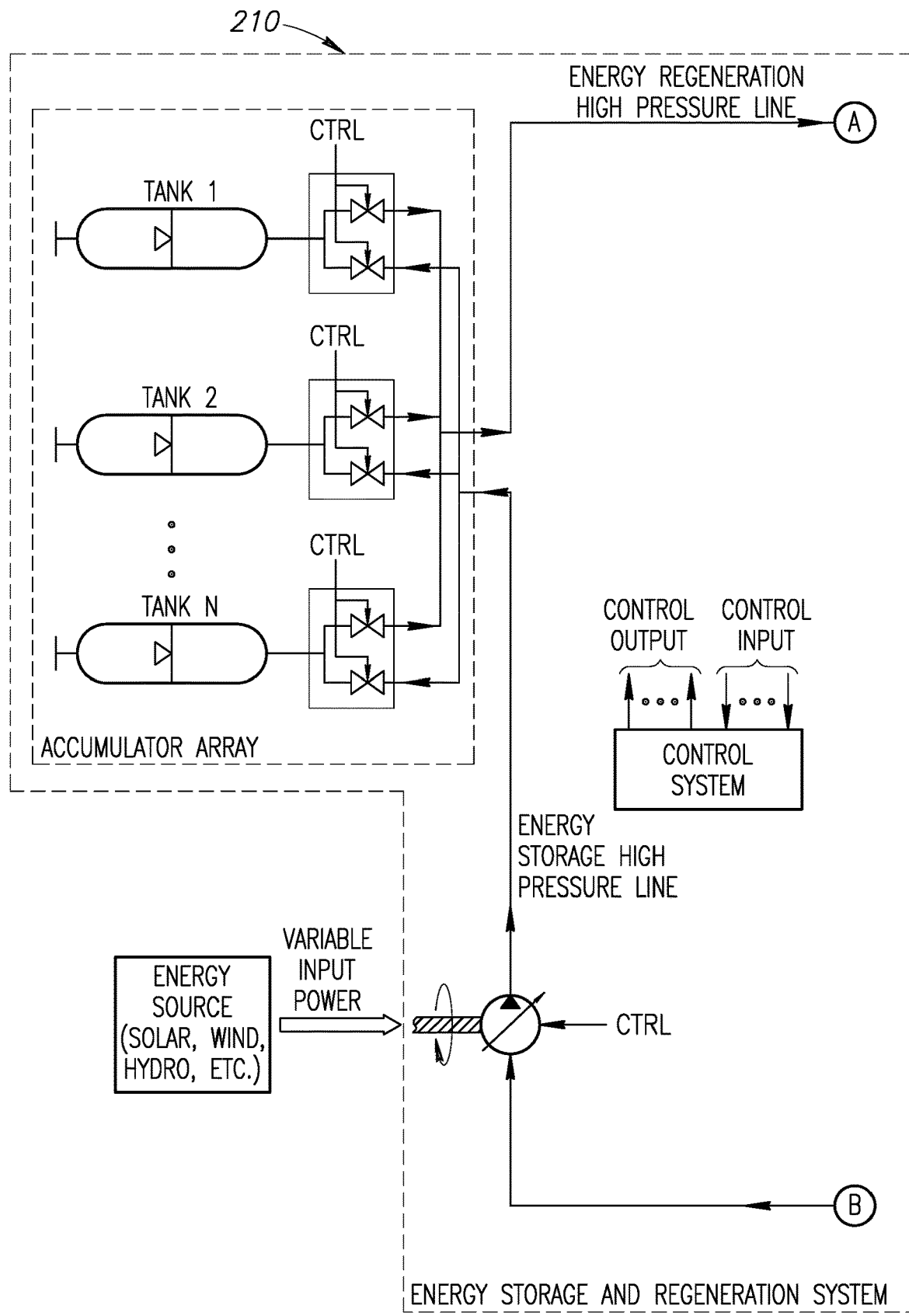
FIGS. 9A and 9B are a block diagram illustrating a fifth example embodiment of the energy storage and regeneration system of the present invention.
Figure 9B:
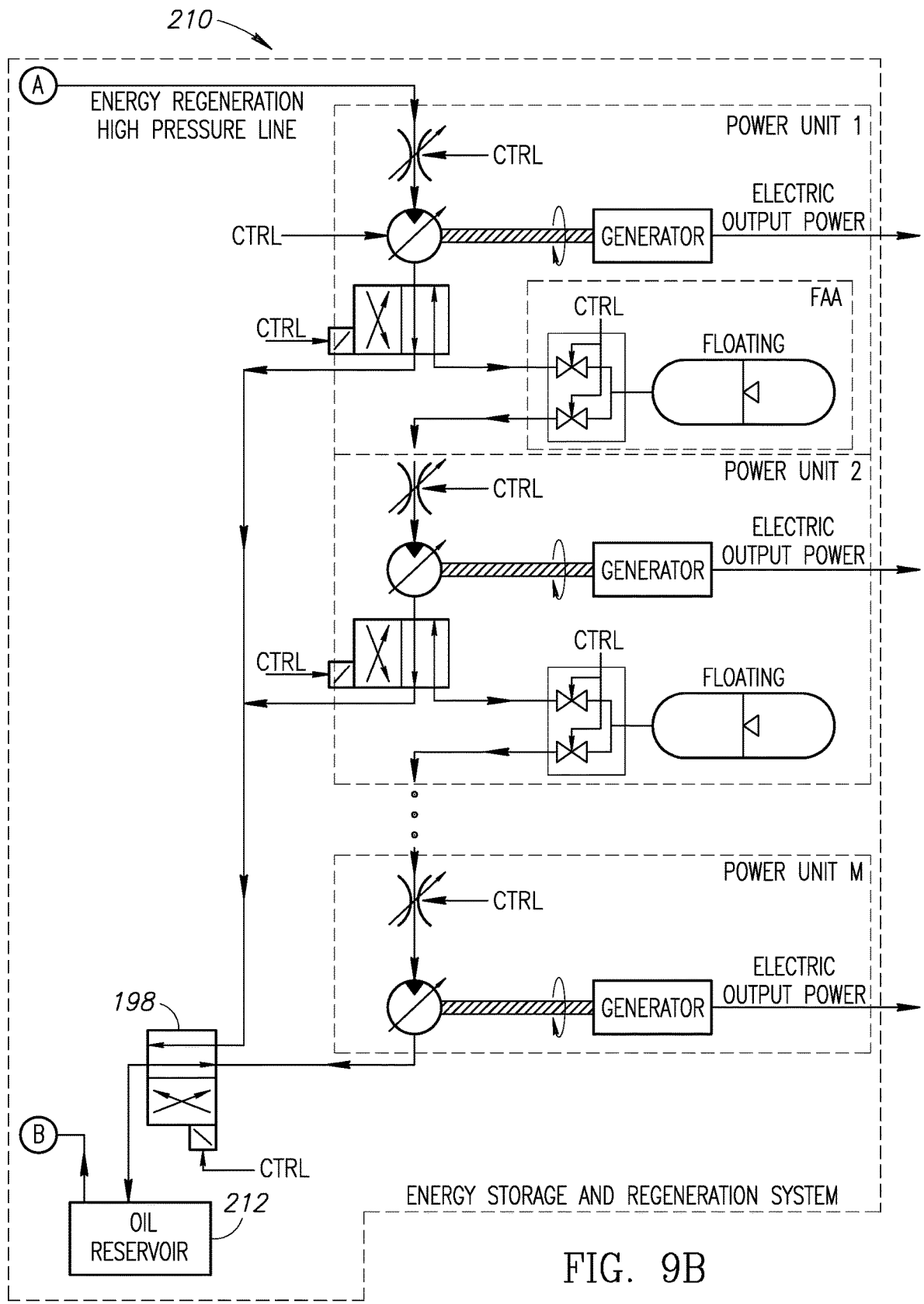

A block diagram illustrating a fifth example embodiment of the energy storage and regeneration system of the present invention is shown in FIGS. 9A and 9B. In this example embodiment, the ESRS, generally referenced 210, is constructed similarly to that of system 160 shown in FIGS. 8A and 8B. The difference is that system 210 includes an oil reservoir 212 for storing hydraulic oil at ambient pressure. The reservoir is fed from an output of the selector 198 which is fed from the output of the motor in power unit M and the outputs of the selectors in power units 1 through M−1. Otherwise, operation of ESRS 210 is similar to that of ESRS 160.

Figure 10:
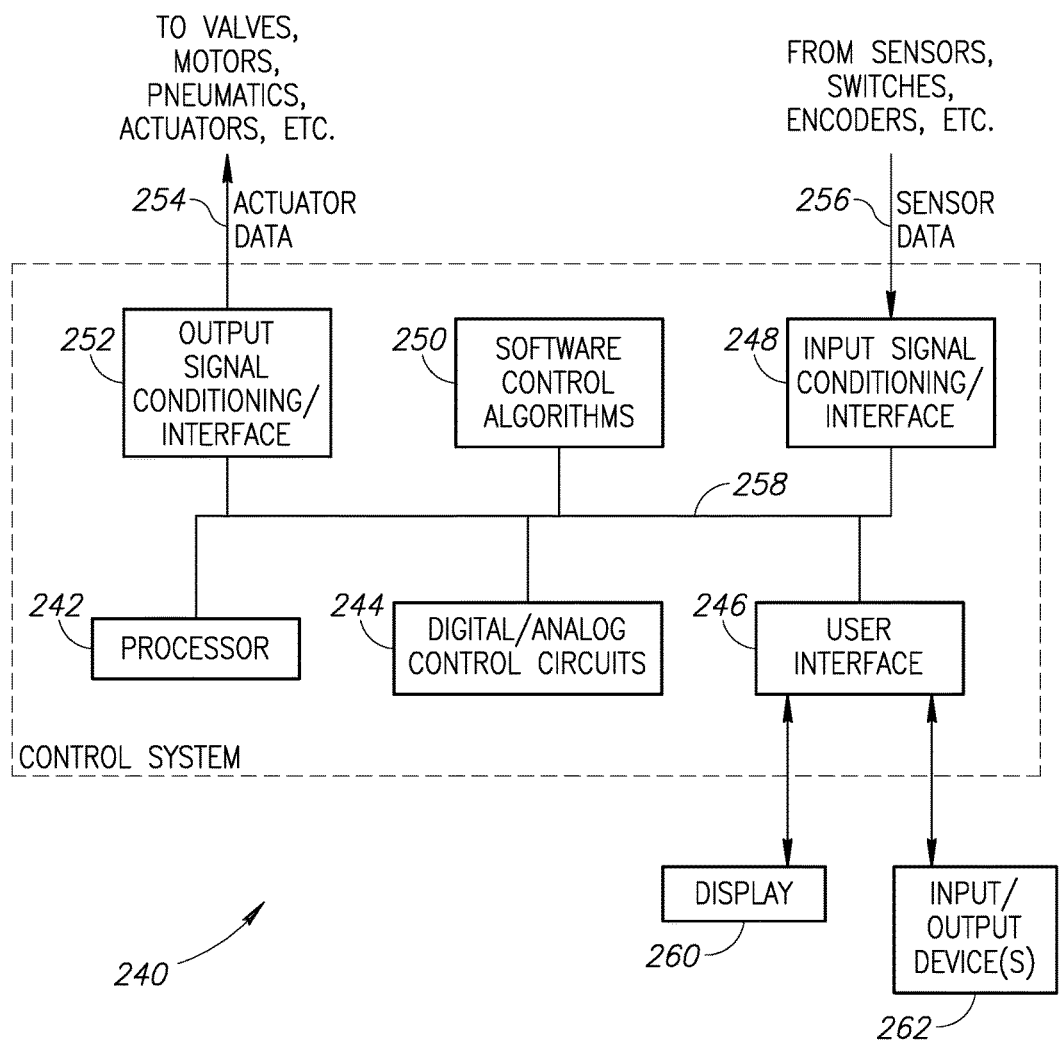
FIG. 10 is a diagram illustrating an example control system of the present invention in more detail.

A diagram illustrating an example control system of the present invention in more detail is shown in FIG. 10. The control system, generally referenced 240, comprises a processor 242, digital/analog control circuit block 244, user interface block 246, input signal conditioning/interfacing block 248, software control algorithms block 250, and output signal conditioning/interfacing block 252. The processor 242 is connected to the various blocks of the control system over one or more control/data buses 258.

The processor 242 may comprise any suitable processor such as a multiprocessor system, microprocessor, microcontroller or microcomputer based system, programmable logic controller (PLC), single board computer (SBC), ASIC or FPGA core, DSP core, distributed computing environment, etc. capable of running the control algorithms, sequencing and timing logic, etc. of the ESRS. Although not shown, the control system comprises any necessary volatile and non-volatile memory to operation purposes including storing of program code.

In one embodiment, the user interface 246 is coupled to a display 260 and one or more input/output devices 262 such as a keyboard, mouse, printer, external memory, etc. The input signal conditioning/interfacing block 248 is operative to receive a plurality of sensor data signals from the various sensors, switches, encoders, etc. in the ESRS. The circuitry in block 248 provides the required conditioning circuitry, analog to digital converters (ADCs), filters, discrete circuits, sense amplifiers, amplifiers, and other circuits to convert the input sensor data 256 into digital signals that can be used by the digital algorithms. The circuitry in block 252 provides the required conditioning circuit, digital to analog converters (DACs), amplifiers, pulse width modulation (PWM) circuits, power transistors, op amps, and other circuits to convert the actuator data output by the processor and/or the digital/analog control circuit block 244 to actuator data signals 254 that are used to operate the various valves, motors, pneumatics, cylinders, actuators, etc. in the ESRS.

Figure 11:
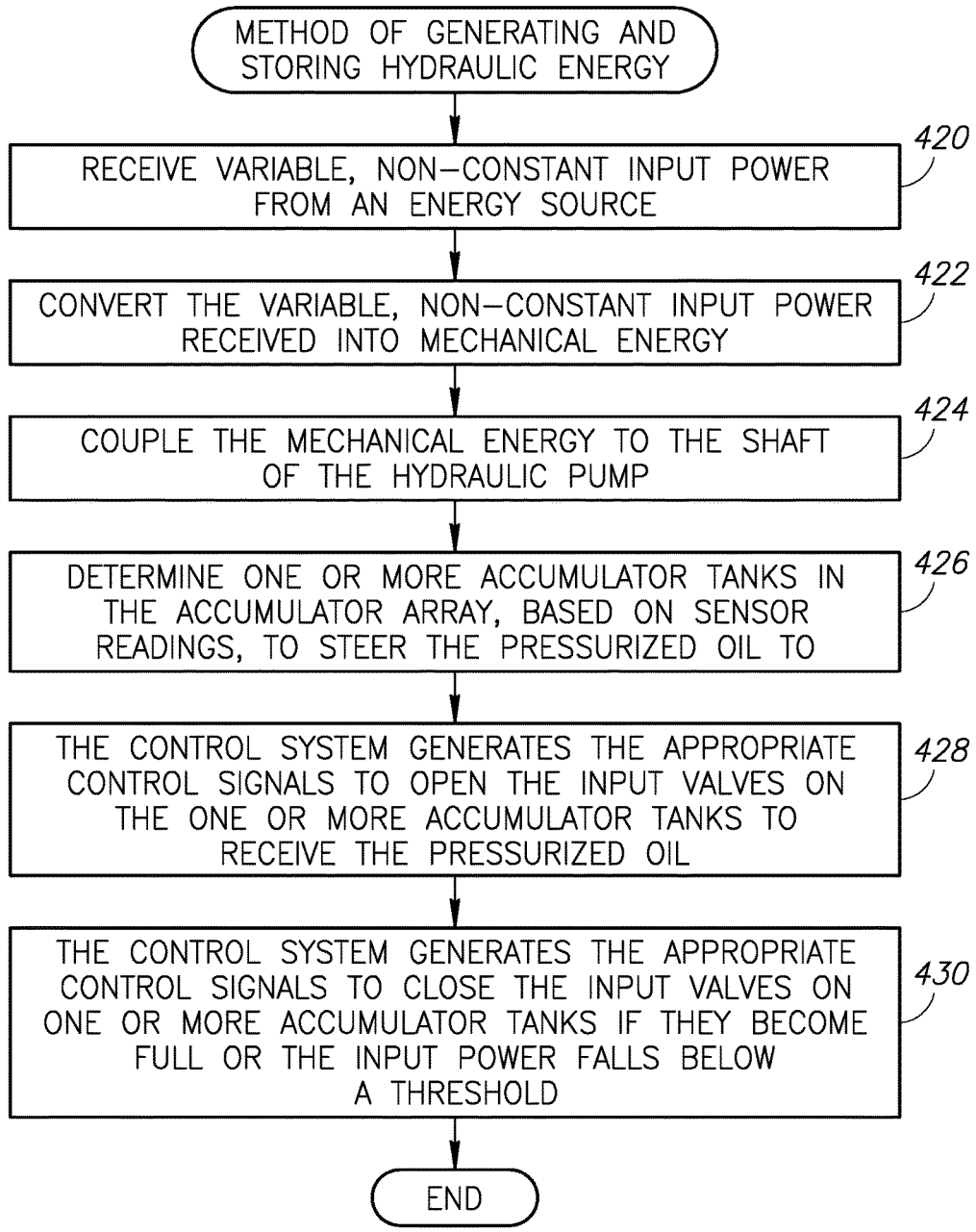
FIG. 11 is a flow diagram illustrating an example method of generating and storing hydraulic energy.

A flow diagram illustrating an example method of generating and storing hydraulic energy is shown in FIG. 11. As described supra, the ESRS receives potentially variable, non-constant input power from an energy source such as wind, solar, etc. (step 420). The ESRS is operative to convert the variable, non-constant input power received into mechanical energy (step 422). For example, electric power from a PV solar array is fed to a generator to convert the electric energy into mechanical energy. The mechanical energy is then coupled to the shaft of the hydraulic pump (step 424). Note that a plurality of hydraulic pumps may be used depending on the particular application and amount of input power to be handled.

The control system, based on sensor readings, determines one or more accumulator tanks in the accumulator array to steer the pressured oil to generated by the pump (step 426). The control system generates the appropriate control signals (e.g., valve control signals) to open the input valves on the one or more accumulator tanks to receive the pressurized oil (step 428). At some point later in time, the control system generates the appropriate control signals to close the input valves on one or more accumulator tanks if they become full or if the input power falls off below a particular threshold (step 430).

Figure 12:
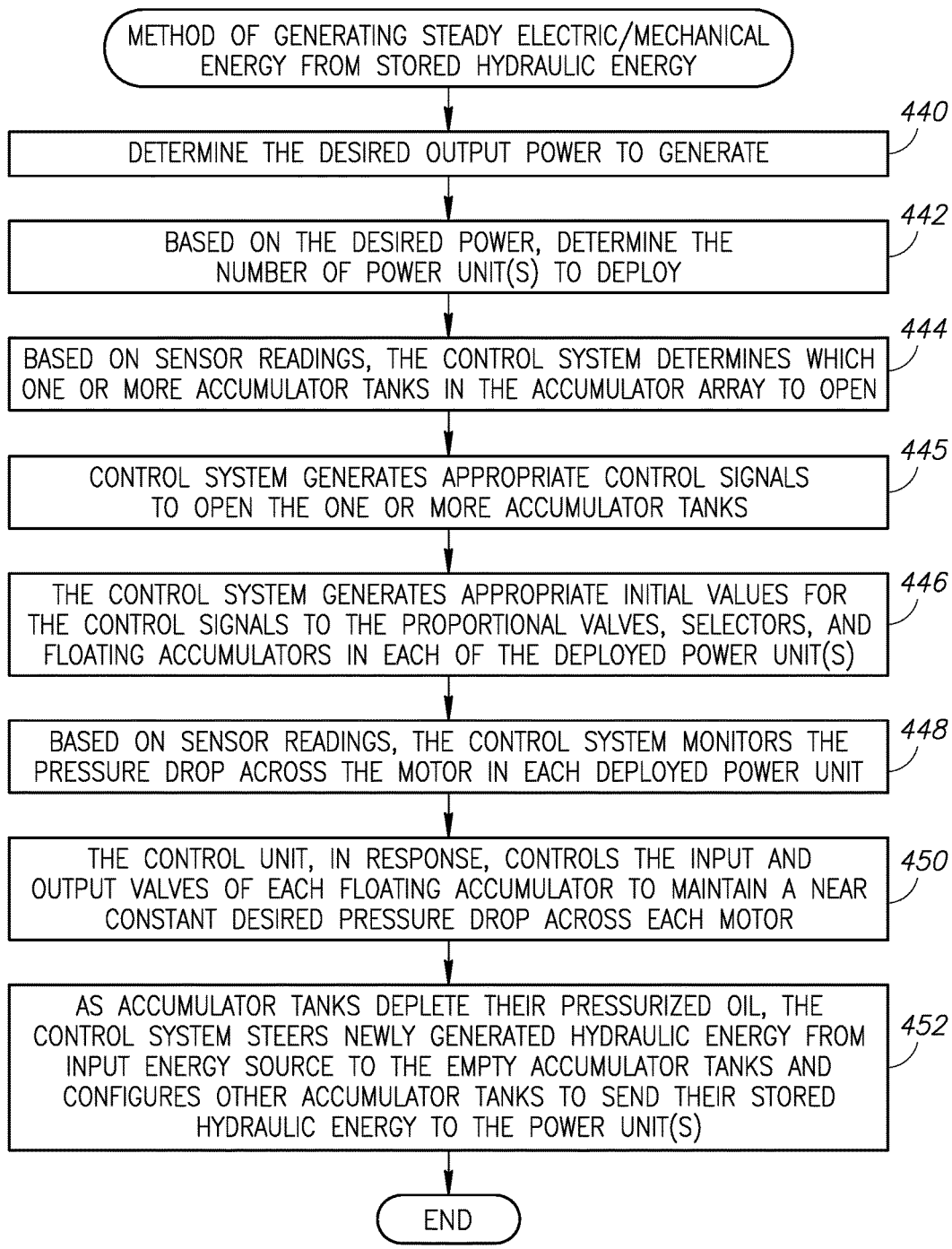
FIG. 12 is a flow diagram illustrating an example method of generating steady electric/mechanical energy from stored hydraulic energy.

A flow diagram illustrating an example method of generating steady electric/mechanical energy from stored hydraulic energy is shown in FIG. 12. First, the desired output power to generate is determined (step 440). This is based on the particular energy demand of the load connected to the ESRS. Typically, this demand is dynamic and thus the control system is constantly making adjustments based on the demand at any point in time.

Based on the desired power, the number of power unit(s) to deploy is determined (step 442). Depending on the particular implementation of the invention, each power unit is capable of generating a certain amount of power. The demand at any point in time translates to a minimum number of power units required.

Once the number of power unit(s) is determined, based on sensor readings, the control system determines which one or more accumulator tanks in the accumulator array to open (step 444). To drive the power unit(s), the hydraulic energy stored in one or more accumulator tanks must be released. The control system generates the appropriate control signals to open the one or more accumulator tanks (step 445).

The control system then generates appropriate initial values for the control signals to the proportional valves, selectors, and floating accumulator assembly in each of the deployed power unit(s) (step 446). Based on sensor readings, the control system monitors the pressure drop across the motors in each deployed power unit (step 448).

The control unit, in response, controls the input and output valves of each floating accumulator assembly to maintain a near constant desired pressure drop across each motor (step 450). As accumulator tanks deplete their stored hydraulic energy (i.e. pressured oil), the control system steers newly generated hydraulic energy from the input energy source to the empty accumulator tanks and configures other accumulator tanks to send their stored hydraulic energy to the power unit(s) (step 452).

It is noted that the methods of FIGS. 11 and 12 are performed in parallel, whereby the accumulator tanks in the array are constantly monitored. Hydraulic energy generated from the input energy source is constantly being stored in the array with the control system monitoring the pressure in each tank and steering the generated hydraulic energy accordingly.

At the same time, hydraulic energy is released from the array to keep the power unit(s) generating a constant steady stream of output power. The control system utilizes the floating accumulator assembly in each power unit to aid in maintaining a steady optimal pressure drop across the motor in each power unit. In this manner, a substantially constant level of output power is generated and provided to the load.

In other embodiments of the present invention, a vehicle is configured to incorporate the ESRS of the present invention. Several examples of vehicles are presented that are adapted to use the ESRS. The types of vehicles described infra include a car, truck, motorcycle, train and boat. These are presented for illustration purposes only given that one skilled in the art can apply the ESRS of the present invention to many different types of other vehicles, not just those presented herein.

Figure 13:
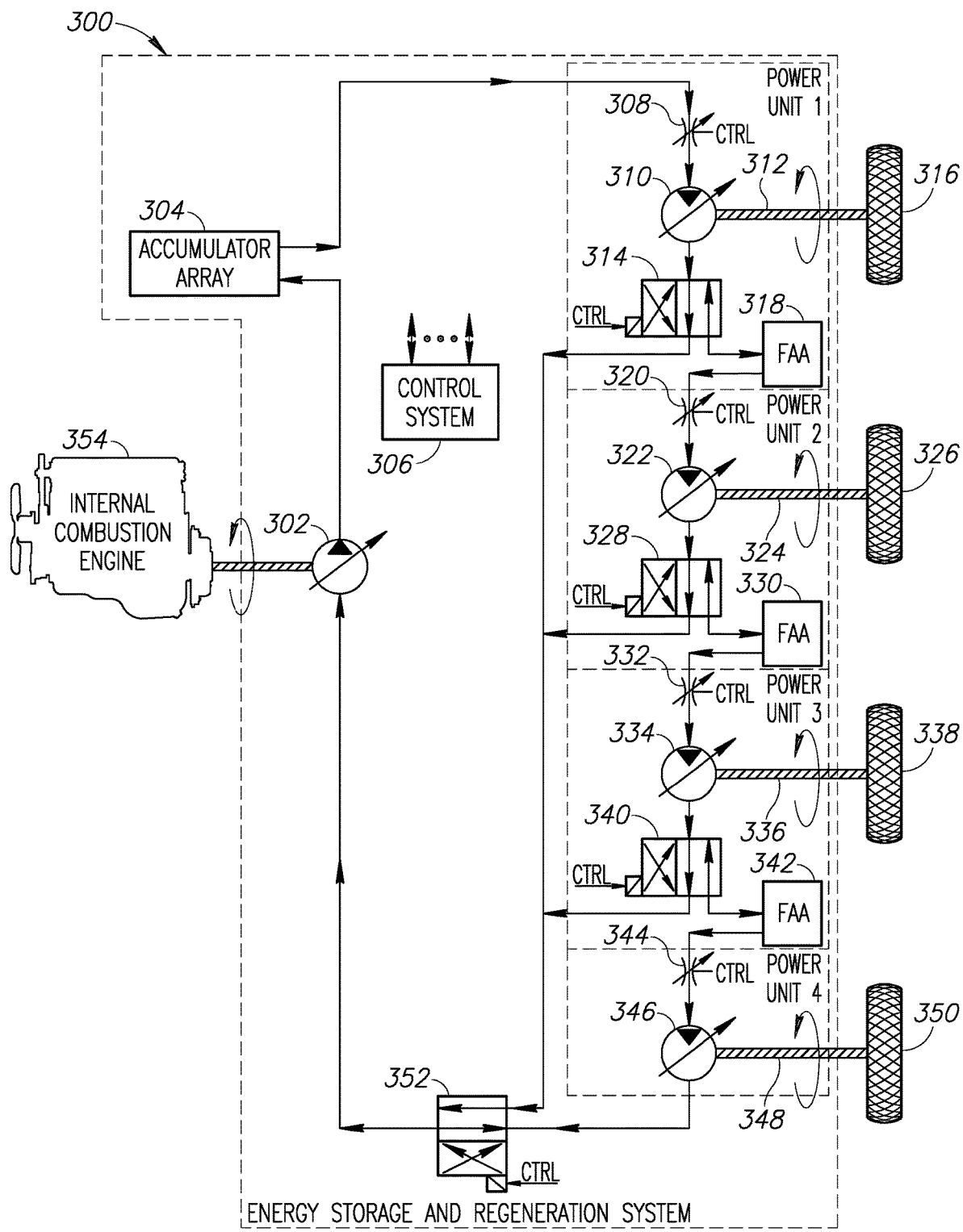
FIG. 13 is a high level block diagram illustrating a first example vehicle incorporating the energy storage and regeneration system of the present invention.

A high level block diagram illustrating a first example vehicle incorporating the energy storage and regeneration system of the present invention is shown in FIG. 13. In this example, the vehicle is a car having four wheels where each wheel is powered by its own hydraulic motor. The system, generally referenced 300, comprises hydraulic pump 302 whose shaft is coupled to a conventional internal combustion engine (ICE) 354, accumulator array 304, four power units, hydraulic selector 352, and control system 306. Power unit 1 comprises hydraulic proportional valve 308, hydraulic motor 310 whose output shaft 312 is coupled to a first wheel 316 of the car, hydraulic selector 314, and floating accumulator assembly (FAA) 318. Similarly, power unit 2 comprises hydraulic proportional valve 320, hydraulic motor 322 whose output shaft 324 is coupled to a second wheel 326 of the car, hydraulic selector 328, and floating accumulator assembly 330. Power unit 3 comprises hydraulic proportional valve 332, hydraulic motor 334 whose output shaft 336 is coupled to a third wheel 338 of the car, hydraulic selector 340, and floating accumulator assembly 342. Power unit 4 comprises hydraulic proportional valve 344, and hydraulic motor 346 whose output shaft 348 is coupled to a forth wheel 350 of the car. Note that in an alternative embodiment, power unit 4 also comprises a hydraulic selector and floating accumulator assembly (not shown). Depending on the implementation and control system algorithms, the hydraulic selector and floating accumulator assembly may or may not be required. Note that the operation of the ESRS is described in detail supra in connection with FIGS. 6, 8A, 8B, 9A, and 9B.

In operation, the ESRS functions to convert the mechanical energy produced by the ICE 354 into hydraulic energy which is stored in the accumulator array. The control system releases the stored energy in a controlled manner to the power units. The floating accumulator assembly in each power unit, along with appropriate control of input and output valves by the control system, functions to maintain a desired pressure difference between the input and output of the hydraulic motor in each power unit. Since the energy received at the input is now decoupled from the energy generated at the output, the ICE is configured to operate at an optimal point, e.g., particular RPM, etc. that optimizes power output while minimizing fuel consumption. If the accumulator array becomes full, the control system will shut down the ICE to conserve fuel.

On the energy output side, the control system, receiving throttle position signals from the driver, is constantly adjusting the fluid pressures across the motor in each power unit. Typically, the speed of each motor is the same since all four wheels on a car spin at the same rotation speed. Thus, the control system algorithm is operative to open and close the input and output valves of the floating accumulator assembly in each power unit such that a desired pressure differential across each respective motor is maintained.

Figure 14:
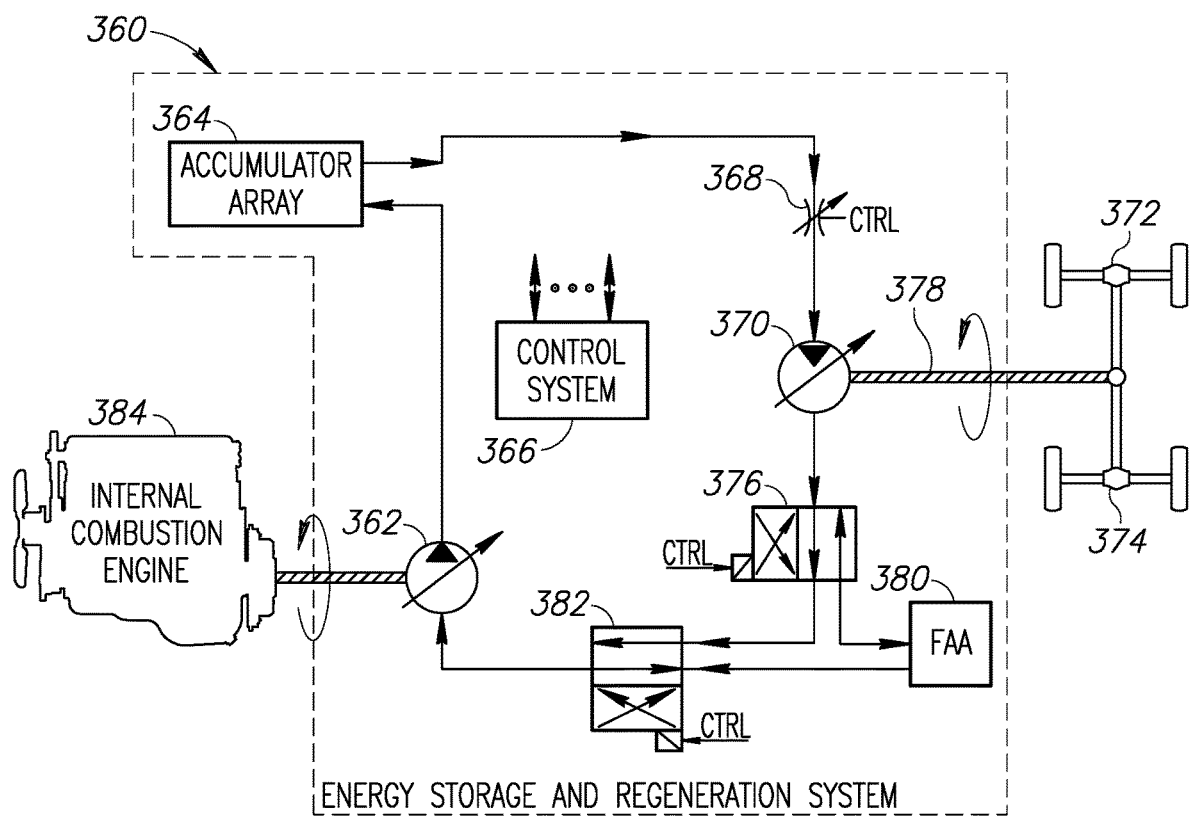
FIG. 14 is a high level block diagram illustrating a second example vehicle incorporating the energy storage and regeneration system of the present invention.

A high level block diagram illustrating a second example vehicle incorporating the energy storage and regeneration system of the present invention is shown in FIG. 14. In this example, the vehicle is a car having four wheels where all four wheels are driven by a single hydraulic motor. The system, generally referenced 360, comprises hydraulic pump 362 whose shaft is coupled to a conventional internal combustion engine (ICE) 384, accumulator array 364, hydraulic proportional valve 368, hydraulic motor 370 whose output shaft 378 is coupled to all four wheels of the car via differential/axle assemblies 372, 374, hydraulic selectors 376, 382, floating accumulator assembly 380, and control system 366. Note that the operation of the ESRS is described in detail supra in connection with FIGS. 6, 8A, 8B, 9A, and 9B.

In operation, the ESRS functions to convert the mechanical energy produced by the ICE 384 into hydraulic energy which is stored in the accumulator array. The control system releases the stored energy in a controlled manner to the hydraulic motor 370. The floating accumulator assembly, along with appropriate control of input and output valves by the control system, functions to maintain a desired pressure difference between the input and output of the hydraulic motor. Since the energy received at the input is now decoupled from the energy generated at the output, the ICE is configured to operate at an optimal point, e.g., particular RPM, etc. that optimizes power output while minimizing fuel consumption. If the accumulator array becomes full, the control system will shut down the ICE to conserve fuel.

On the energy output side, the control system, receiving throttle position signals from the driver, is constantly adjusting the fluid pressures across the motor. Thus, the control system algorithm is operative to open and close the input and output valves of the floating accumulator assembly such that a desired pressure differential across the motor is maintained.

Figure 15:
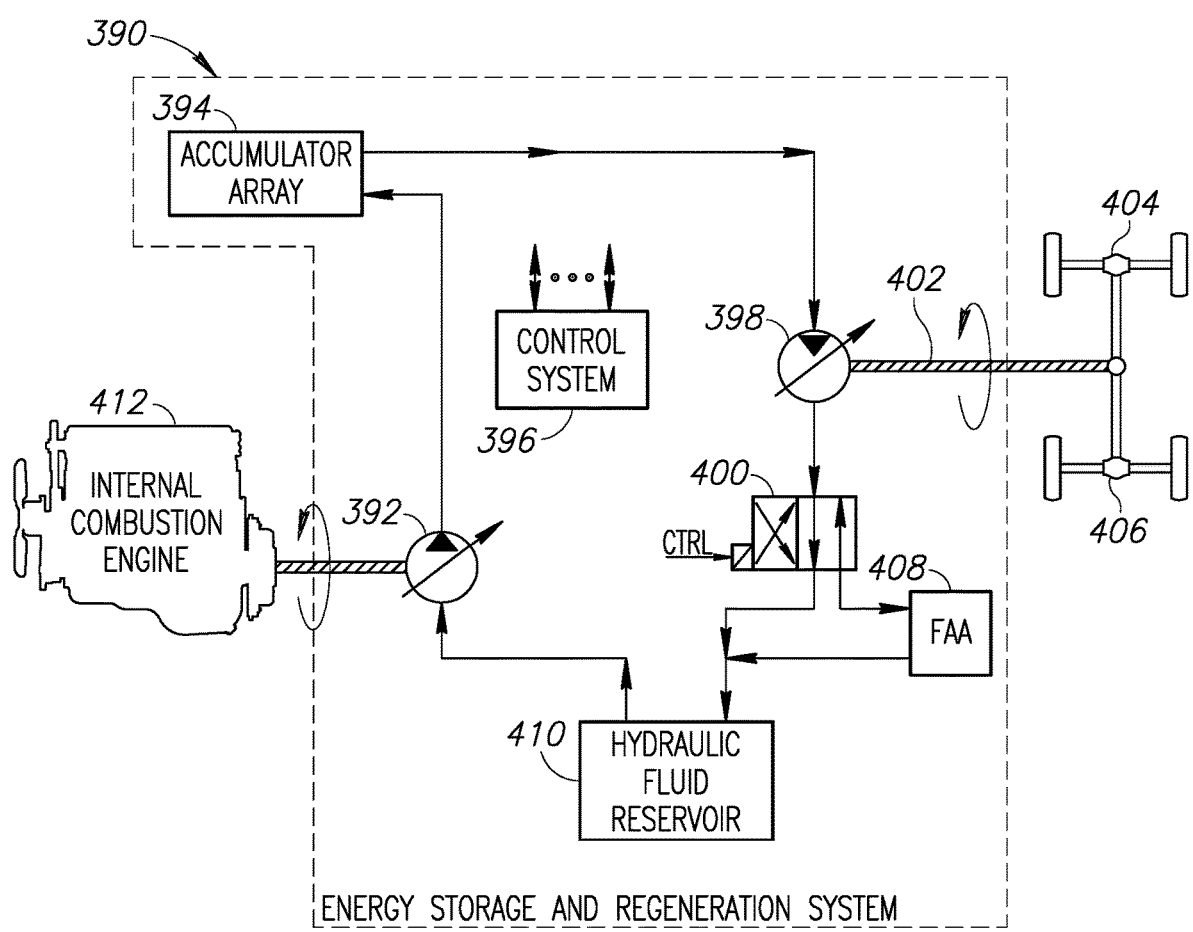
FIG. 15 is a high level block diagram illustrating a third example vehicle incorporating the energy storage and regeneration system of the present invention.

A high level block diagram illustrating a third example vehicle incorporating the energy storage and regeneration system of the present invention is shown in FIG. 15. In this example, the vehicle is a car having four wheels where all four wheels are driven by a single hydraulic motor. The system, generally referenced 390, comprises hydraulic pump 392 whose shaft is coupled to a conventional internal combustion engine (ICE) 412, accumulator array 394, hydraulic motor 398 whose output shaft 402 is coupled to all four wheels of the car via differential/axle assemblies 404, 406, hydraulic selector 400, floating accumulator assembly 408, hydraulic fluid reservoir 410, and control system 396. Note that the operation of the ESRS is described in detail supra in connection with FIGS. 6, 8A, 8B, 9A, and 9B.

In operation, the ESRS functions to convert the mechanical energy produced by the ICE 412 into hydraulic energy which is stored in the accumulator array. The control system releases the stored energy in a controlled manner to the hydraulic motor 398. The floating accumulator assembly, along with appropriate control of input and output valves by the control system, functions to maintain a desired pressure difference between the input and output of the hydraulic motor. Since the energy received at the input is now decoupled from the energy generated at the output, the ICE is configured to operate at an optimal point, e.g., particular RPM, etc. that optimizes power output while minimizing fuel consumption. If the accumulator array becomes full, the control system will shut down the ICE to conserve fuel.

On the energy output side, the control system, receiving throttle position signals from the driver, is constantly adjusting the fluid pressures across the motor. Thus, the control system algorithm is operative to open and close the input and output valves of the floating accumulator assembly such that a desired pressure differential across the motor is maintained.

Figure 16:
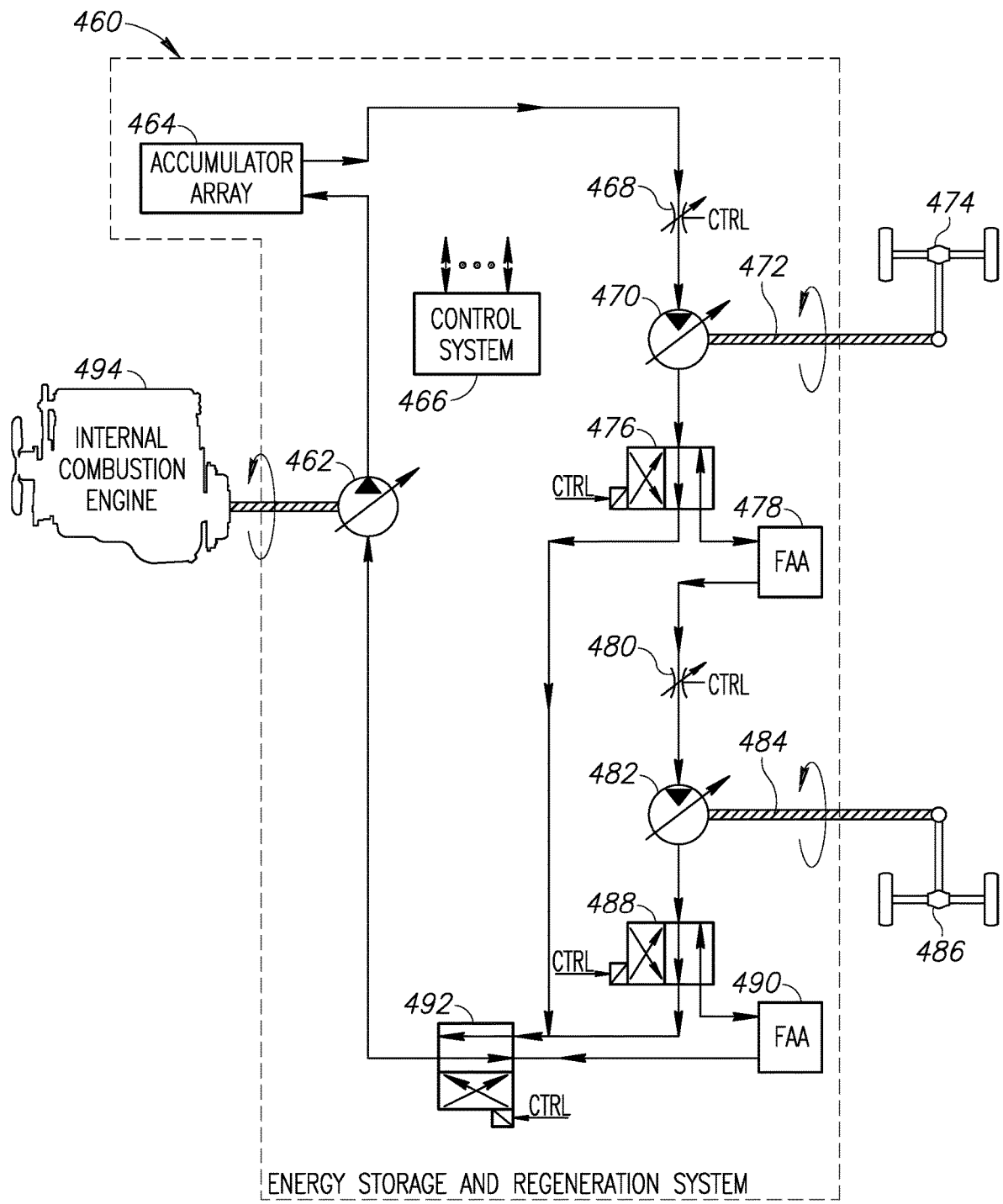
FIG. 16 is a high level block diagram illustrating a fourth example vehicle incorporating the energy storage and regeneration system of the present invention.

A high level block diagram illustrating a fourth example vehicle incorporating the energy storage and regeneration system of the present invention is shown in FIG. 16. In this example, the vehicle is a car having four wheels where the front two wheels and the rear two wheels are driven by separate hydraulic motors. The system, generally referenced 460, comprises hydraulic pump 462 whose shaft is coupled to a conventional internal combustion engine (ICE) 494, accumulator array 464, hydraulic proportional valve 468, hydraulic motor 470 whose shaft 472 is coupled to front differential/axle assembly 474 powering the front two wheels, hydraulic selector 476, floating accumulator assembly 478, hydraulic proportional valve 480, hydraulic motor 482 whose shaft 484 is coupled to front differential/axle assembly 486 powering the rear two wheels, hydraulic selector 488, floating accumulator assembly 490, hydraulic selector 492, and control system 466. Note that the operation of the ESRS is described in detail supra in connection with FIGS. 6, 8A, 8B, 9A, and 9B.

In operation, the ESRS functions to convert the mechanical energy produced by the ICE 494 into hydraulic energy which is stored in the accumulator array. The control system releases the stored energy in a controlled manner to the hydraulic motors 470, 482. The floating accumulator assemblies, along with appropriate control of input and output valves by the control system, functions to maintain a desired pressure difference between the input and output of each hydraulic motor. Since the energy received at the input is now decoupled from the energy generated at the output, the ICE is configured to operate at an optimal point, e.g., particular RPM, etc. that optimizes power output while minimizing fuel consumption. If the accumulator array becomes full, the control system will shut down the ICE to conserve fuel.

On the energy output side, the control system, receiving throttle position signals from the driver, is constantly adjusting the fluid pressures across the input and output of the motors. Thus, the control system algorithm is operative to open and close the input and output valves of the floating accumulator assemblies such that a desired pressure differential across each motor is maintained.

Figure 17:
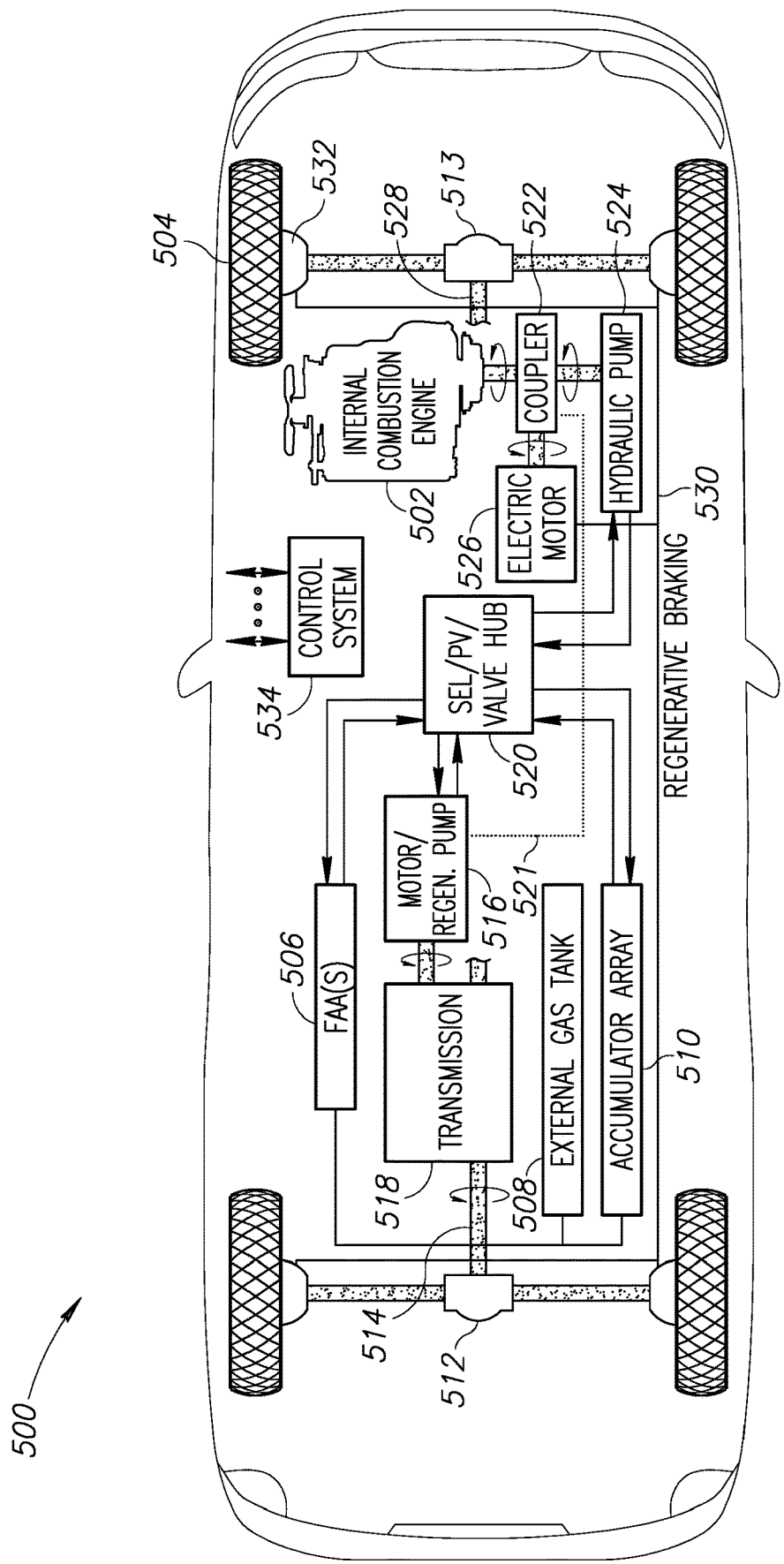
FIG. 17 is a diagram illustrating a fifth example vehicle incorporating the energy storage and regeneration system of the present invention.

A diagram illustrating a fifth example vehicle incorporating the energy storage and regeneration system of the present invention is shown in FIG. 17. In this example, the vehicle is a car having four wheels where all four wheels are powered by a single hydraulic motor. The system, generally referenced 500, comprises hydraulic pump 524, mechanical coupler device 522, conventional internal combustion engine (ICE) 502, electric motor 526, accumulator array 506, floating accumulator assembly(s) 506, external gas tank 508, hydraulic proportional valve/selector/valve hub 520, hydraulic motor/regeneration pump 516, front differential/axle assembly 513, rear differential/axle assembly 512, transmission/gear box 518, braking regenerators 532, wheels 504, and control system 534. Depending on the implementation, a hydraulic fluid reservoir (not shown) may or may not be included in the system. Note that the operation of the ESRS is described in detail supra in connection with FIGS. 6, 8A, 8B, 9A, and 9B.

In one embodiment, assuming a single hydraulic motor, the configuration of the ESRS of FIG. 17 is similar to the ESRS of FIGS. 14 and 15 described in detail supra. The present embodiment also comprises breaking energy recapture whereby braking energy is converted into electricity via braking regenerators 532 attached to wheels 504. The electricity generated during breaking is applied to electric motor 526 whose mechanical power output is applied to the pump 524 via coupler 522. Mechanical output power from conventional ICE 502 also powers pump 524 via coupler 522.

In addition, the example car embodiment is shown including an external gas tank (e.g., nitrogen) 508 coupled to the bladders in the accumulator tanks (not shown) making up the accumulator array 510 and the tanks (not shown) making up the floating accumulator assembly(s) 506. As described supra, the addition of the external gas tank, significantly increases the dynamic range of the accumulators connected to it.

In operation, the proportional valve/selector/valve hub 520 functions to route the hydraulic fluid between the various components of the ESRS in the car as well as provide proportional valve and selector functionality. Hydraulic energy from the accumulator array is released in a controlled manner by the control system to power the transmission 518 whose output provides power to the front differential/axle 513 via shaft 528 and to the rear differential/axle 512 via shaft 514. Note that an alternative breaking energy regeneration system comprises a regeneration pump 516 attached to the transmission. The regeneration pump may comprise a combination hydraulic motor/regeneration pump or may comprise a separate motor and regeneration pump depending on implementation. The function of the regeneration pump is to capture breaking energy from the wheels via the transmission. In one embodiment, captured mechanical energy is returned to the pump 524 via the coupler 522 through mechanical connection 521 (dotted line). In an alternative embodiment, captured mechanical energy is converted to hydraulic energy first via the regeneration pump 516 which is then returned to the pump 524 via coupler 522 through hydraulic hose 521 (dotted line).

Figure 18:
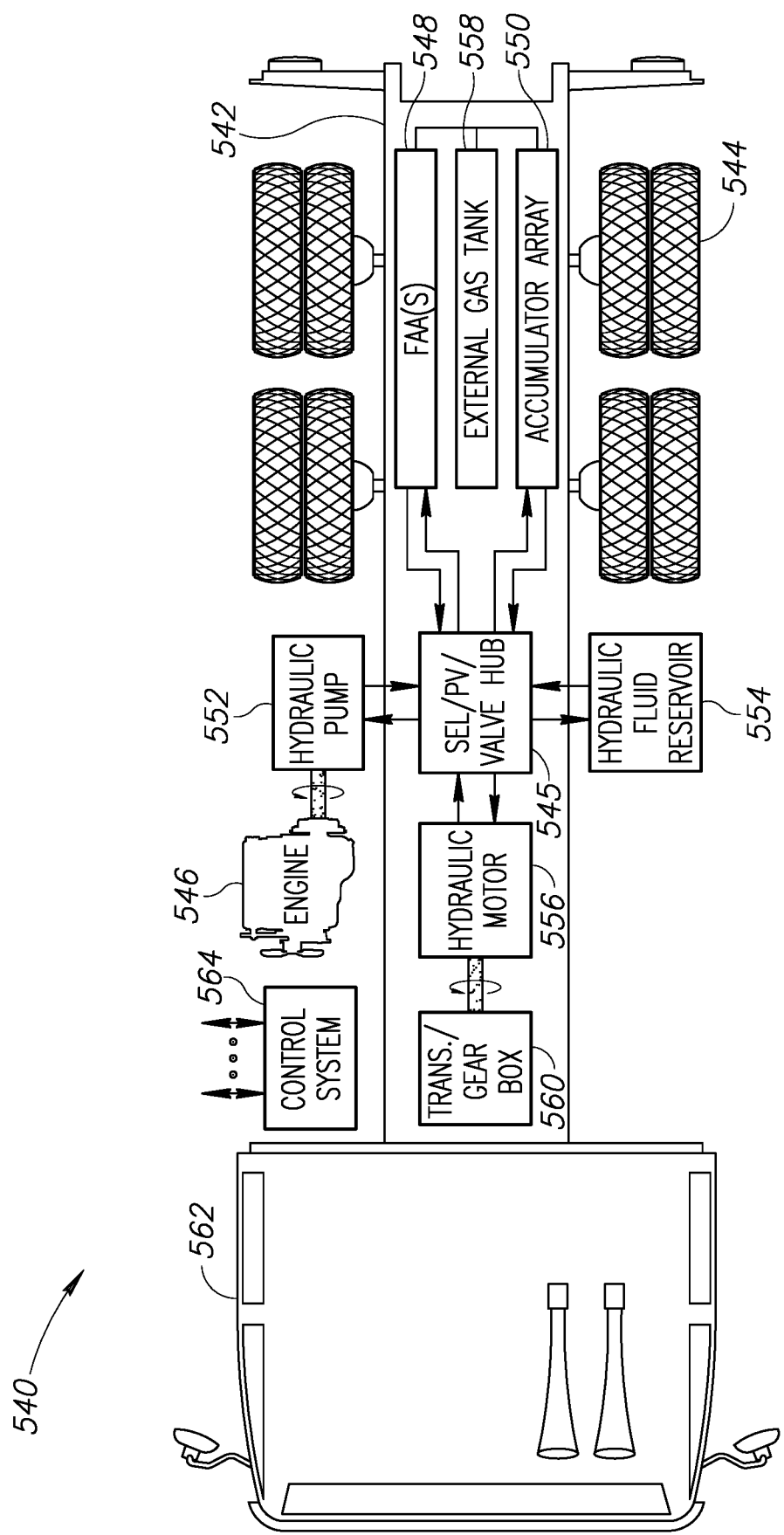
FIG. 18 is a high level block diagram illustrating a sixth example vehicle incorporating the energy storage and regeneration system of the present invention.

A high level block diagram illustrating a sixth example vehicle incorporating the energy storage and regeneration system of the present invention is shown in FIG. 18. In this example, the vehicle is a truck having ten wheels where one or more wheels are powered by one or more hydraulic power unit(s). The system, generally referenced 540, comprises hydraulic pump 552, mechanical coupler device (not shown), conventional engine (e.g., diesel, gasoline, etc.) 546, accumulator array 550, floating accumulator assembly(s) 548, external gas tank 558, hydraulic proportional valve/selector/valve hub 545, hydraulic motor 556, hydraulic fluid reservoir (optional depending on implementation) 554, transmission/gear box 560, wheels 544, control system 564, frame 542, and cab 562. Note that the operation of the ESRS is described in detail supra in connection with FIGS. 6, 8A, 8B, 9A, and 9B. Note also that depending on the particular implementation, the configuration of the truck based ESRS shown in FIG. 18 is similar to the ESRS shown in FIGS. 13, 14, 15, 16, and 17 described in detail supra.

In addition, the example truck embodiment is shown including an external gas tank (e.g., nitrogen) 558 coupled to the bladders in the accumulator tanks (not shown) making up the accumulator array 550 and the tanks (not shown) making up the floating accumulator assembly(s) 548. As described supra, the addition of the external gas tank, significantly increases the dynamic range of the accumulators connected to it.

In operation, the proportional valve/selector/valve hub 545 functions to route the hydraulic fluid between the various components of the ESRS in the truck as well as provide proportional valve and selector functionality. Hydraulic energy from the accumulator array is released in a controlled manner by the control system to power the transmission/gear box 560 whose output provides power to the wheels.

Figure 19:
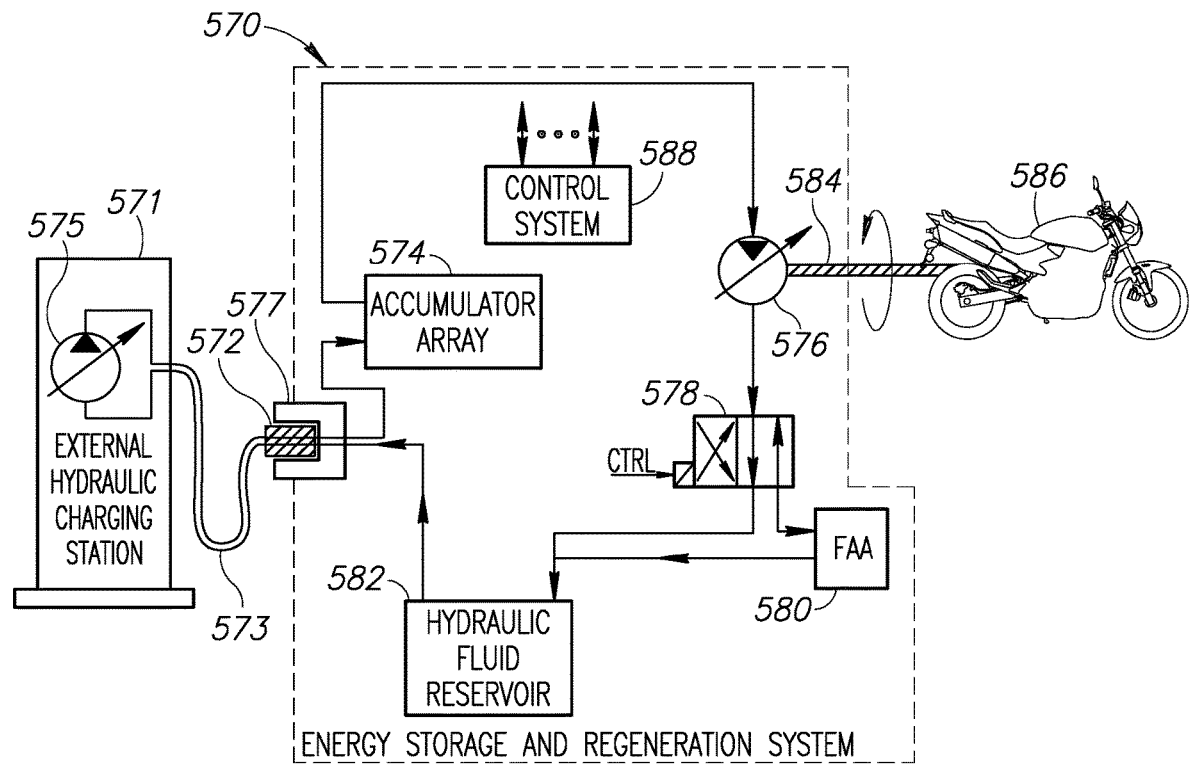
FIG. 19 is a high level block diagram illustrating a seventh example vehicle incorporating the energy storage and regeneration system of the present invention.

A high level block diagram illustrating a seventh example vehicle incorporating the energy storage and regeneration system of the present invention is shown in FIG. 19. In this example, the vehicle is a motorcycle, scooter, etc. having two wheels where one or both wheels are driven by a single hydraulic motor. The system, generally referenced 570, comprises the ESRS system but without a hydraulic pump. In this example embodiment, the user connects the ESRS to an external hydraulic charging station 571 via hydraulic hose 573 and connector/coupler 572/577. The system also comprises accumulator array 574, hydraulic motor 576, hydraulic selector 578, floating accumulator assembly 580, hydraulic fluid reservoir 582, and control system 588. Note that the operation of the ESRS is described in detail supra in connection with FIGS. 6, 8A, 8B, 9A, and 9B.

In operation, the ESRS receives a 'charge' of pressurized hydraulic fluid via connector/coupler 572/577 from an external hydraulic charging station 571 incorporating a hydraulic pump 571. The pressurized hydraulic fluid is stored in accumulator array 574 and low pressure hydraulic fluid is removed from the reservoir 582. The control system releases the stored energy in a controlled manner to the hydraulic motor 576 which is coupled to the drive train of the motorcycle 586 via shaft 584. The floating accumulator assembly, along with appropriate control of input and output valves by the control system, functions to maintain a desired pressure difference between the input and output of the hydraulic motor.

On the energy output side, the control system, receiving throttle position signals from the rider, is constantly adjusting the fluid pressure across the motor. Thus, the control system algorithm is operative to open and close the input and output valves of the floating accumulator assembly such that a desired pressure differential across the motor is maintained. When the system is in operation, the low pressure hydraulic fluid output by the selector and/or the floating accumulator assembly is collected by the hydraulic fluid reservoir 582 until the motorcycle is connected to an external charging station again.

Figure 20:
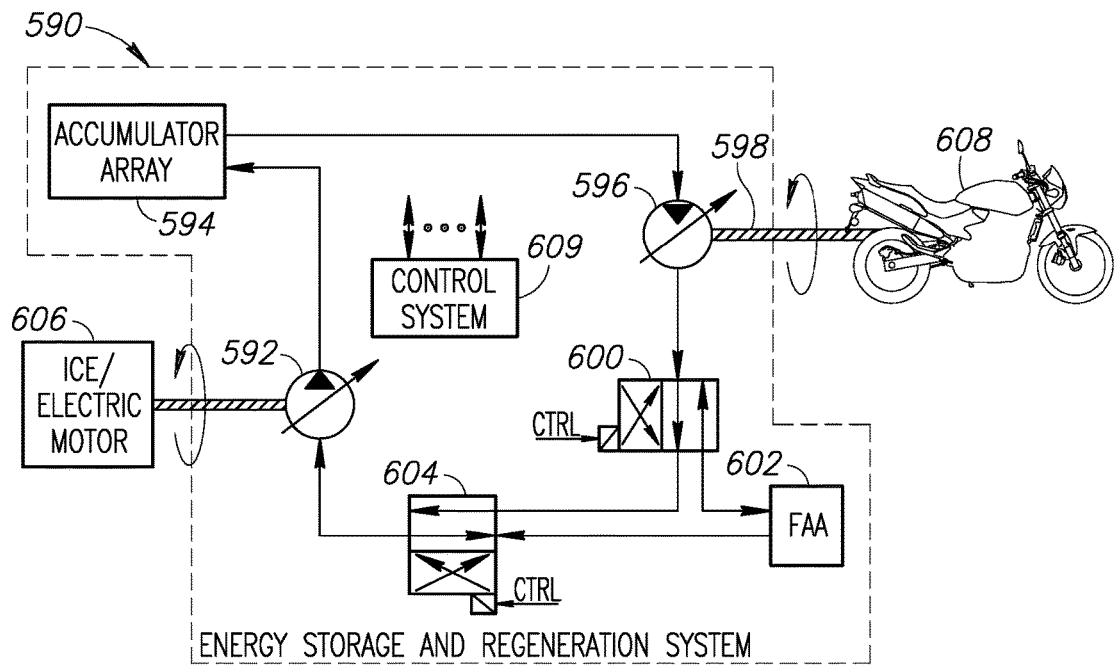
FIG. 20 is a high level block diagram illustrating an eighth example vehicle incorporating the energy storage and regeneration system of the present invention.

A high level block diagram illustrating an eighth example vehicle incorporating the energy storage and regeneration system of the present invention is shown in FIG. 20. In this example, the vehicle is a motorcycle, scooter, etc. having two wheels where one or both wheels are driven by a single hydraulic motor. The system, generally referenced 590, comprises a hydraulic pump 592 coupled to a conventional internal combustion engine (ICE) or electric motor 606, accumulator array 594, hydraulic motor 596 coupled to the motorcycle drive train 608 via shaft 598, hydraulic selectors 600, 604, hydraulic selector 600, floating accumulator assembly 602, and control system 609. Note that the operation of the ESRS is described in detail supra in connection with FIGS. 6, 8A, 8B, 9A, and 9B. Note also that depending on the particular implementation, the configuration of the motorcycle based ESRS shown in FIG. 20 is similar to the ESRS shown in FIG. 14 described in detail supra.

In operation, the ESRS functions to convert the mechanical energy produced by the ICE/electric motor 606 into hydraulic energy which is stored in the accumulator array. The control system releases the stored energy in a controlled manner to the hydraulic motor 596. The floating accumulator assembly, along with appropriate control of input and output valves by the control system, functions to maintain a desired pressure difference between the input and output of the hydraulic motor. Since the energy received at the input is now decoupled from the energy generated at the output, the ICE/electric motor is configured to operate at an optimal point, e.g., particular RPM, current/voltage, etc. that optimizes power output while minimizing fuel/electric power consumption. If the accumulator array becomes full, the control system will shut down the ICE/electric motor to conserve fuel/electricity.

On the energy output side, the control system, receiving throttle position signals from the rider, is constantly adjusting the fluid pressure across the motor. Thus, the control system algorithm is operative to open and close the input and output valves of the floating accumulator assembly such that a desired pressure differential across the motor is maintained.

Figure 21:
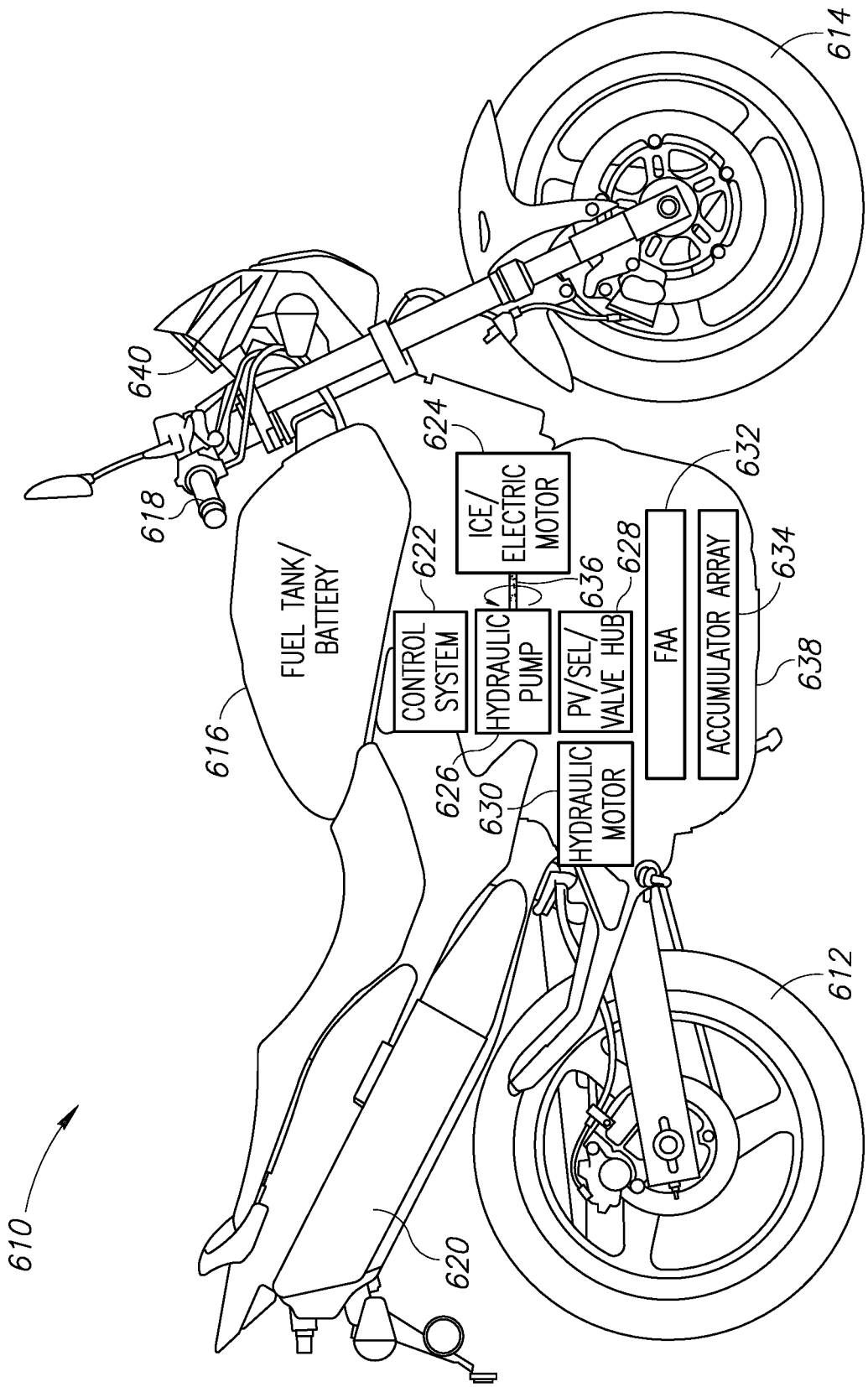
FIG. 21 is a diagram illustrating a ninth example vehicle incorporating the energy storage and regeneration system of the present invention.

A high level block diagram illustrating a ninth example vehicle incorporating the energy storage and regeneration system of the present invention is shown in FIG. 21. In this example, the vehicle is a motorcycle having two wheels where either one or both wheels are powered by a single hydraulic motor. The motorcycle, generally referenced 610, a frame 638, front wheel 614, rear wheel 612, instrument cluster 640, throttle 618, exhaust 620, conventional internal combustion engine (ICE) or electric motor 624, fuel tank/battery 616, hydraulic pump 626, accumulator array 638, floating accumulator assembly 632, optional external gas tank (not shown), hydraulic proportional valve/selector/valve hub 628, hydraulic motor 630, and control system 622. Note that the operation of the ESRS is described in detail supra in connection with FIGS. 6, 8A, 8B, 9A, and 9B. Note also that the hydraulic connections between the various components of the ESRS are not shown for clarity sake. The connections, however, are shown in FIGS. 19 and 20 described in detail supra.

In one embodiment, assuming a single hydraulic motor, the configuration of the ESRS of FIG. 21 is similar to the ESRS of FIG. 19 described in detail supra. In this embodiment, the engine/motor 624 and associated fuel tank/battery 616 are not needed as the motorcycle charges hydraulic energy from an external hydraulic charging station 571. The hydraulic energy pumped from the charging station is stored in the accumulator array and eventually in the floating accumulator assembly as well during operation.

In another embodiment, assuming a single hydraulic motor, the configuration of the ESRS of FIG. 21 is similar to the ESRS of FIG. 20 described in detail supra.

Optionally, the motorcycle includes an external gas tank (e.g., nitrogen) coupled to the bladders in the accumulator tanks (not shown) making up the accumulator array 634 and the tanks (not shown) making up the floating accumulator assembly 632. As described supra, the addition of the external gas tank, significantly increases the dynamic range of the accumulators connected to it.

In operation, the proportional valve/selector/valve hub 628 functions to route the hydraulic fluid between the various components of the ESRS in the motorcycle as well as provide proportional valve and selector functionality. Hydraulic energy from the accumulator array is released in a controlled manner by the control system to power the transmission (not shown) whose output provides power to the rear and/or front wheel.

Figure 22:
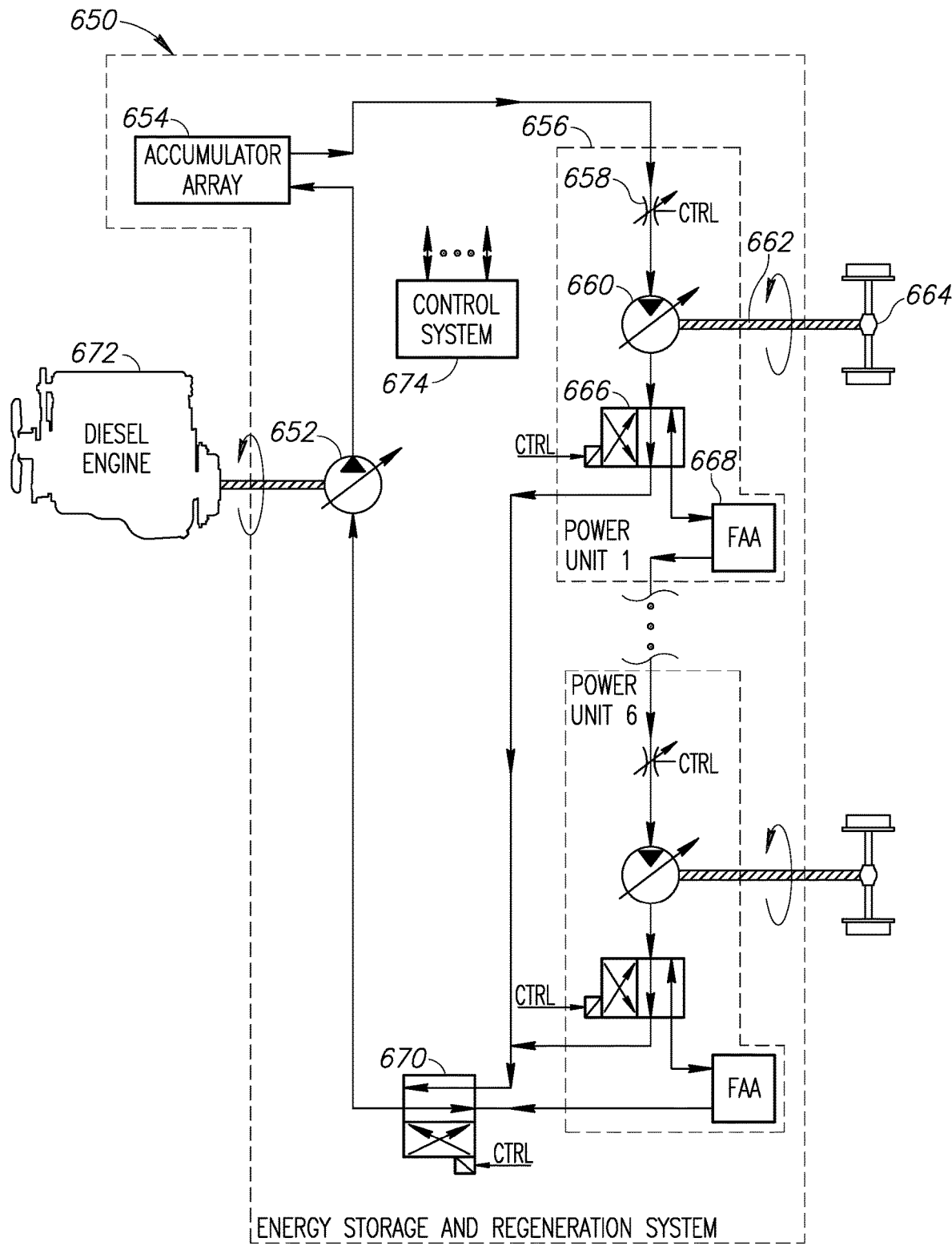
FIG. 22 is a high level block diagram illustrating a tenth example vehicle incorporating the energy storage and regeneration system of the present invention.

A high level block diagram illustrating a tenth example vehicle incorporating the energy storage and regeneration system of the present invention is shown in FIG. 22. In this example, the vehicle is a train locomotive having twelve wheels where each pair of wheels is powered by its own separate power unit. The system, generally referenced 650, comprises hydraulic pump 652 whose shaft is coupled to a conventional engine (e.g., diesel, gasoline, etc.) 672, accumulator array 654, six power units 656, hydraulic selector 670, and control system 674. Each power unit is configured to provide power to one of the six pairs of wheel sets. Power units 1 through 6 comprises hydraulic proportional valve 658, hydraulic motor 660 whose output shaft 662 is coupled to a wheel set 664 of the locomotive, hydraulic selector 666, and floating accumulator assembly 668. Note that the operation of the ESRS is described in detail supra in connection with FIGS. 6, 8A, 8B, 9A, and 9B. Note also that depending on the particular implementation, the configuration of the train locomotive based ESRS shown in FIG. 22 is similar to the ESRS shown in FIG. 13 described in detail supra, with the addition of two power units.

In operation, the ESRS functions to convert the mechanical energy produced by the engine 672 into hydraulic energy which is stored in the accumulator array. The control system releases the stored energy in a controlled manner to the power units. The floating accumulator assembly in each power unit, along with appropriate control of input and output valves by the control system, functions to maintain a desired pressure difference between the input and output of the hydraulic motor in each power unit. Since the energy received at the input is now decoupled from the energy generated at the output, the engine is configured to operate at an optimal point, e.g., particular RPM, etc. that optimizes power output while minimizing fuel consumption. If the accumulator array becomes full, the control system will shut down the engine to conserve fuel.

On the energy output side, the control system, receiving throttle position signals from the engineer in the cab, is constantly adjusting the fluid pressures across the motor in each power unit. Typically, the speed of each motor is the same since all six wheel sets on the train locomotive spin at the same rotation speed. Thus, the control system algorithm is operative to open and close the input and output valves of the floating accumulator assembly in each power unit such that a desired pressure differential across each respective motor is maintained.

Figure 23:
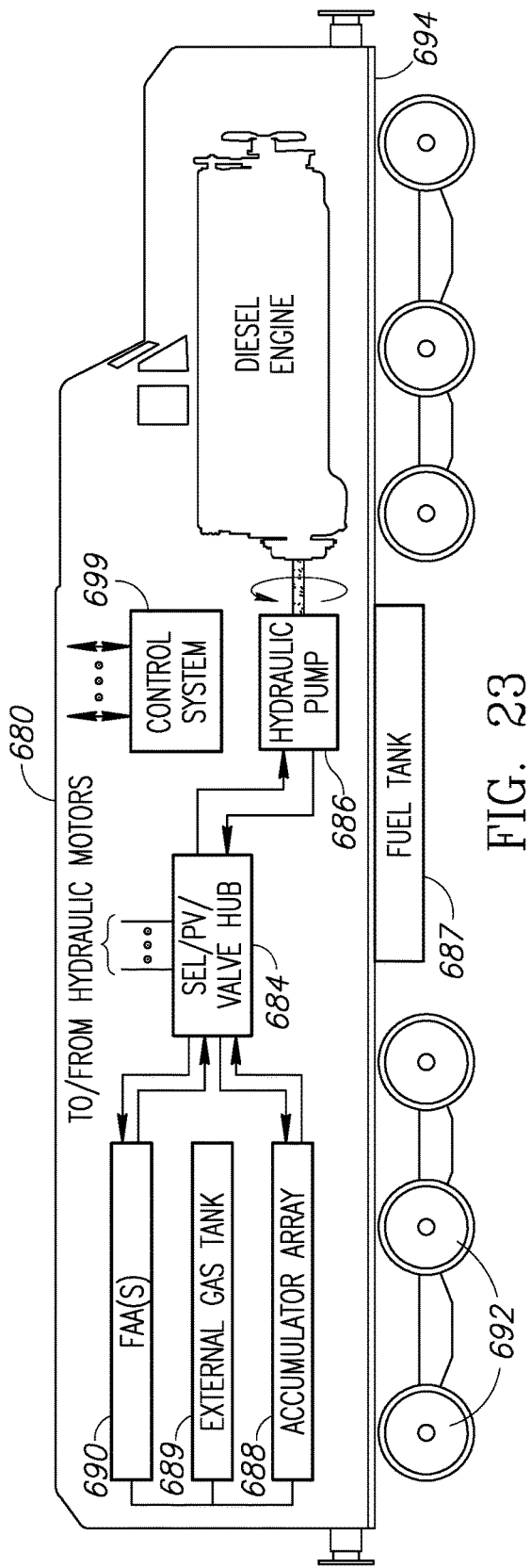
FIGS. 23 and 24 is a diagram illustrating an eleventh example vehicle incorporating the energy storage and regeneration system of the present invention.
Figure 24:
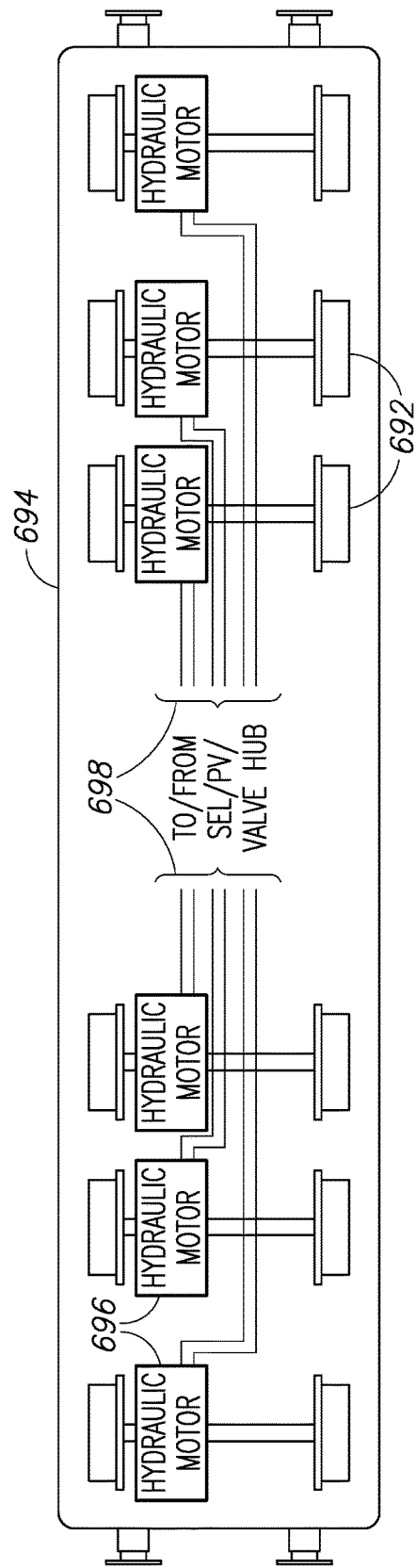

A diagram illustrating an eleventh example vehicle incorporating the energy storage and regeneration system of the present invention is shown in FIGS. 23 and 24. In this example, the vehicle is a train locomotive having twelve wheels where each pair of wheels is powered by its own separate power unit. The system, generally referenced 680, comprises hydraulic pump 686 whose shaft is coupled to a conventional engine (e.g., diesel, gasoline, etc.) 682, platform or frame 694, fuel tank 687, accumulator array 688, floating accumulator assembly(s) 690, six hydraulic motors 696, hydraulic proportional valve/selector/valve hub 684, and control system 699. Each hydraulic motor 696 is configured to provide power to one of the six pairs of wheel sets 692. The hydraulic lines 698 are coupled to the hydraulic proportional valve/selector/valve hub 684. Note that the operation of the ESRS is described in detail supra in connection with FIGS. 6, 8A, 8B, 9A, and 9B. Note also that depending on the particular implementation, the configuration of the train locomotive based ESRS shown in FIG. 26 is similar to the ESRS shown in FIG. 25 described in detail supra. Note further that depending on the implementation, a hydraulic fluid reservoir (not shown) may or may not be included in the system.

In operation, the ESRS functions to convert the mechanical energy produced by the engine 682 into hydraulic energy which is stored in the accumulator array. The control system releases the stored energy in a controlled manner to the power units. The floating accumulator assembly in each power unit, along with appropriate control of input and output valves by the control system, functions to maintain a desired pressure difference between the input and output of each hydraulic motor. Since the energy received at the input is decoupled from the energy generated at the output, the engine is configured to operate at an optimal point, e.g., particular RPM, etc. that optimizes power output while minimizing fuel consumption. If the accumulator array becomes full, the control system will shut down the engine to conserve fuel.

On the energy output side, the control system, receiving throttle position signals from the engineer in the cab, is constantly adjusting the fluid pressures across each of the motors. Typically, the speed of each motor is the same since all six wheel sets on the train locomotive spin at the same rotation speed. Thus, the control system algorithm is operative to open and close the input and output valves of the floating accumulator assembly associated with each motor such that a desired pressure differential across each respective motor is maintained.

Figure 25:
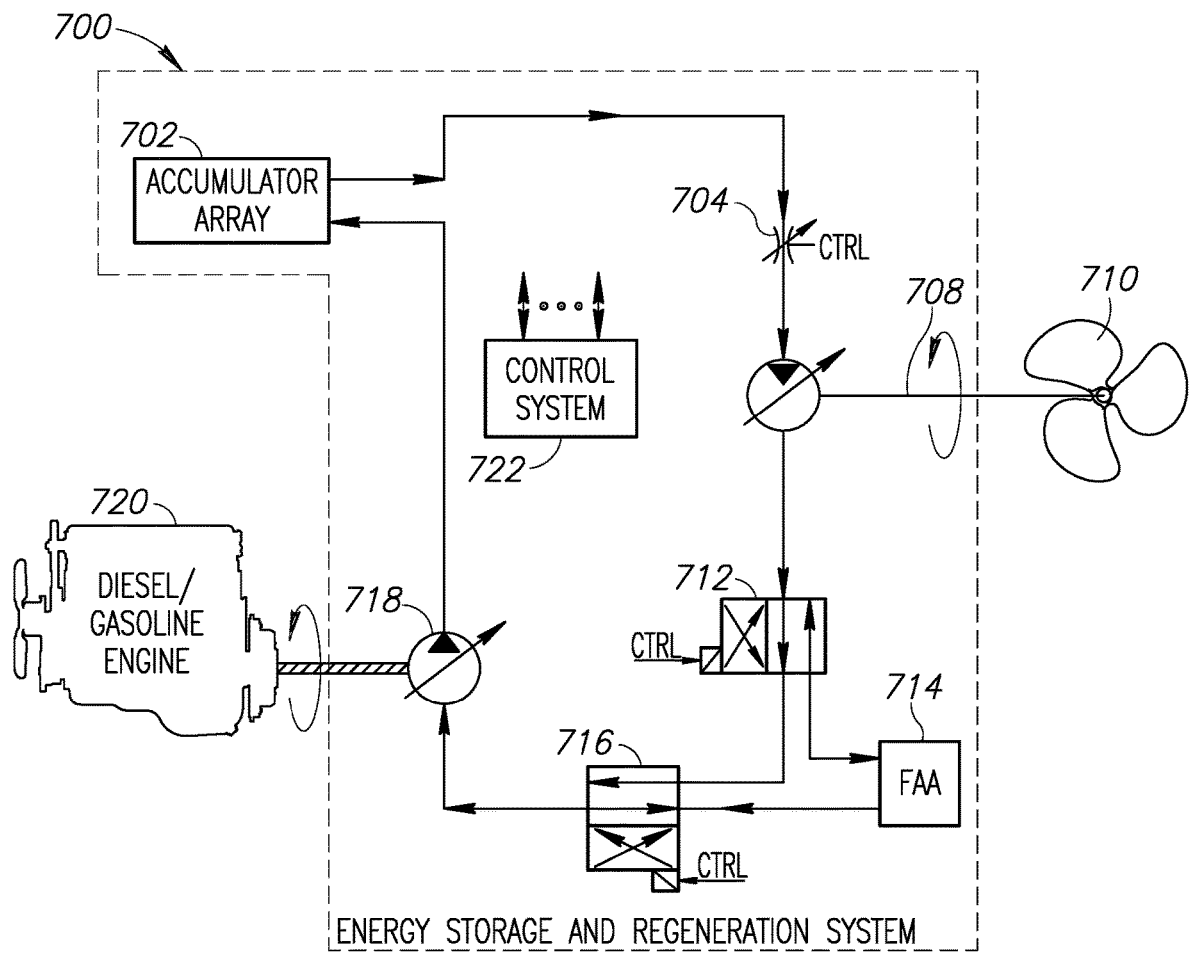
FIG. 25 is a high level block diagram illustrating a twelfth example vehicle incorporating the energy storage and regeneration system of the present invention.
Figure 26:
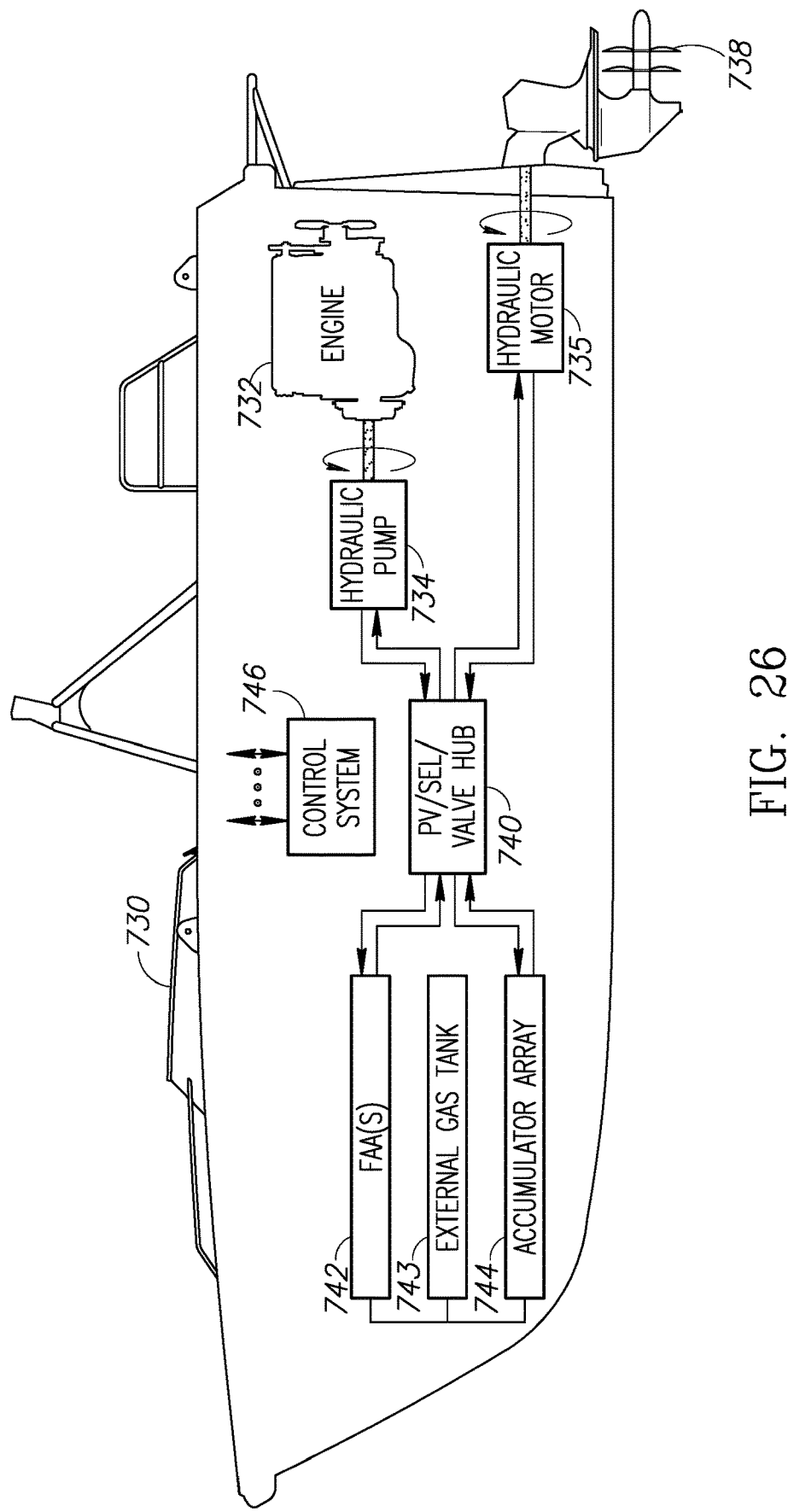
FIG. 26 is a diagram illustrating a thirteenth example vehicle incorporating the energy storage and regeneration system of the present invention.

A high level block diagram illustrating a twelfth example vehicle incorporating the energy storage and regeneration system of the present invention is shown in FIG. 25. In this embodiment, the vehicle is a boat, ship, yacht, etc. having one or more propellers where the one or more propellers are driven by one or more hydraulic motors. For illustration purposes only, the example described is a boat having a single propeller driven by a single hydraulic motor. The system, generally referenced 700, comprises a hydraulic pump 718 coupled to a conventional engine (e.g., diesel, gasoline, etc.) 606, accumulator array 702, hydraulic proportional valve 704, hydraulic motor 706 coupled to the propeller 710 via shaft 708, hydraulic selectors 712, 716, floating accumulator assembly 714, and control system 722. Note that the operation of the ESRS is described in detail supra in connection with FIGS. 6, 8A, 8B, 9A, and 9B. Note also that depending on the particular implementation, the configuration of the boat based ESRS shown in FIG. 25 is similar to the ESRS shown in FIG. 14 described in detail supra.

In operation, the ESRS functions to convert the mechanical energy produced by the engine 720 into hydraulic energy which is stored in the accumulator array. The control system releases the stored energy in a controlled manner to the hydraulic motor 706. The floating accumulator assembly, along with appropriate control of input and output valves by the control system, functions to maintain a desired pressure difference between the input and output of the hydraulic motor. Since the energy received at the input is now decoupled from the energy generated at the output, the engine is configured to operate at an optimal point, e.g., particular RPM, etc., that optimizes power output while minimizing fuel power consumption. If the accumulator array becomes full, the control system will shut down the engine to conserve fuel.

On the energy output side, the control system, receiving throttle position signals from the driver/captain, is constantly adjusting the fluid pressure across the motor. Thus, the control system algorithm is operative to open and close the input and output valves of the floating accumulator assembly such that a desired pressure differential across the motor is maintained.

A diagram illustrating a thirteenth example vehicle incorporating the energy storage and regeneration system of the present invention is shown in FIG. 26. In this example, the vehicle is a boat, ship, yacht, etc. having a propeller powered by a single hydraulic motor. The system, generally referenced 730, comprises hydraulic pump 734, conventional engine 732, accumulator array 744, floating accumulator assembly(s) 742, optional external gas tank 743, hydraulic proportional valve/selector/valve hub 740, hydraulic motor 735 coupled to propeller 738 via shaft 736, and control system 746. Note that the operation of the ESRS is described in detail supra in connection with FIGS. 6, 8A, 8B, 9A, and 9B. Note also that the configuration of the ESRS of FIG. 26 is similar to the ESRS of FIG. 25 described in detail supra. Note further that depending on the implementation, a hydraulic fluid reservoir (not shown) may or may not be included in the system.

In operation, the proportional valve/selector/valve hub 740 functions to route the hydraulic fluid between the various components of the ESRS in the boat as well as provide proportional valve and selector functionality. Hydraulic energy from the accumulator array is released in a controlled manner by the control system to turn the propeller 738 via shaft 736.

Those skilled in the art will recognize that the boundaries between logic and circuit blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A hydraulic energy powered vehicle, comprising:
   a frame;
   an engine mounted on said frame and operative to supply a source of mechanical energy;
   a hydraulic pump coupled to said source of mechanical energy, said hydraulic pump operative to convert mechanical energy output from said engine to hydraulic pressurized energy;
   an accumulator array including one or more accumulator tanks, said accumulator array coupled to the output of said hydraulic pump via one or more first high pressure lines, said accumulator array operative to store the hydraulic energy converted by said hydraulic pump in the one or more accumulator tanks;
   a hydraulic motor coupled to said accumulator array via one or more second high pressure lines and operative to convert hydraulic energy released from said accumulator array into mechanical energy;
   a floating accumulator assembly coupled to said hydraulic motor, said floating accumulator assembly operative to set back pressure on a corresponding upstream hydraulic motor so as to maintain a substantially constant pressure differential thereacross, and operative to provide stored power to any downstream situated hydraulic motor;
   a control system coupled to said accumulator array and said floating accumulator assembly, said control system operative to coordinate the storage and release of hydraulic energy into and out of the one or more individual accumulator tanks of said accumulator array via separate input and output valves in accordance with throttle commands from a driver; and
   wherein said control system is operative to control the charging and discharging of hydraulic fluid into and out of said floating accumulator assembly such that the pressure differential across said hydraulic motor is maintained at a desired level in accordance with the throttle commands.

2. The vehicle according to claim 1, wherein gas bladders in said one or more accumulator tanks are coupled in parallel to an external gas tank.

3. The vehicle according to claim 1, wherein each accumulator tank is capable of operating independently and in isolation to all other accumulator tanks and wherein the pressures maintained in said accumulator tanks are independent of each other.

4. The vehicle according to claim 1, wherein said engine comprises at least one of a gasoline engine, and diesel engine.

5. The vehicle according to claim 1, wherein said vehicle is selected from a group including a car, truck, motorcycle, train, and boat.

6. The vehicle according to claim 1, wherein the mechanical output of said hydraulic motor is coupled to at least one of a plurality of wheels, a train wheel set, and a propeller.

7. A hydraulic energy powered vehicle, comprising:
at least one engine operative to supply a source of mechanical energy;
a hydraulic pump coupled to said source of mechanical energy, said hydraulic pump operative to convert mechanical energy output from said engine to hydraulic pressurized energy;
an accumulator array including a plurality of accumulator tanks, said accumulator array coupled to the output of said hydraulic pump via one or more first high pressure lines, said accumulator array operative to store the hydraulic energy converted by said hydraulic pump in said plurality of accumulator tanks;
one or more power units coupled to said accumulator array via one or more second high pressure lines and operative to convert hydraulic energy released from said accumulator array into mechanical energy, each power unit including a hydraulic motor and a floating accumulator assembly, said floating accumulator assembly operative to set back pressure on a corresponding upstream hydraulic motor so as to maintain a substantially constant pressure differential thereacross, and operative to provide stored power to any downstream situated hydraulic motor;
a control system coupled to said accumulator array and said one or more power units, said control system operative to coordinate the storage and release of hydraulic energy into and out of the individual accumulator tanks of said accumulator array and the floating accumulator assembly in each power unit via separate input and output valves, respectively, in accordance with a throttle command from a driver; and
wherein said control system is operative to control the charging and discharging of hydraulic fluid into and out of the floating accumulator assembly in each respective power unit such that the pressure differential across a corresponding hydraulic motor is maintained at a desired level in accordance with the throttle command.

8. The vehicle according to claim 7, wherein gas bladders in said one or more accumulator tanks are coupled in parallel to an external gas tank.

9. The vehicle according to claim 7, wherein each accumulator tank is capable of operating independently and in isolation to all other accumulator tanks and wherein the pressures maintained in said accumulator tanks are independent of each other.

10. The vehicle according to claim 7, wherein said engine comprises at least one of a gasoline engine, and diesel engine.

11. The vehicle according to claim 7, wherein said vehicle is selected from a group including a car, truck, motorcycle, train, and boat.

12. The vehicle according to claim 7, wherein the mechanical output of said hydraulic motor is coupled to at least one of a plurality of wheels, a train wheel set, and a propeller.

13. A hydraulic energy powered vehicle, comprising:
a frame;
a hydraulic coupler operative to temporarily connect said vehicle to a hydraulic charging station;
an accumulator array mounted on said frame, said accumulator array including one or more accumulator tanks, said accumulator array coupled to said hydraulic coupler via one or more first high pressure lines, said accumulator array operative to store hydraulic pressurized energy received from said charging station in the one or more accumulator tanks;
a hydraulic motor coupled to said accumulator array via one or more second high pressure lines and operative to convert hydraulic energy released from said accumulator array into mechanical energy;
a floating accumulator assembly coupled to said hydraulic motor, said floating accumulator assembly operative to set back pressure on a corresponding upstream hydraulic motor so as to maintain a substantially constant pressure differential thereacross, and operative to provide stored power to any downstream situated hydraulic motor;
a control system coupled to said accumulator array and said floating accumulator assembly, said control system operative to coordinate the storage of hydraulic energy from the charging station into the one or more individual accumulator tanks of said accumulator array, as well as the release of hydraulic energy out of the one or more individual accumulator tanks of said accumulator array in accordance with throttle commands from a driver; and
wherein said control system is operative to control the charging and discharging of hydraulic fluid into and out of said floating accumulator assembly such that the pressure differential across said hydraulic motor is maintained at a desired level in accordance with the throttle commands.

14. The vehicle according to claim 13, wherein gas bladders in said one or more accumulator tanks are coupled in parallel to an external gas tank.

15. The vehicle according to claim 13, wherein each accumulator tank is capable of operating independently and in isolation to all other accumulator tanks and wherein the pressures maintained in said accumulator tanks are independent of each other.

16. The vehicle according to claim 13, further comprising a hydraulic fluid reservoir operative to be coupled to said hydraulic charging station via said hydraulic coupler when said vehicle is temporarily connected thereto.

17. The vehicle according to claim 13, wherein said vehicle is selected from a group including a car, truck, motorcycle, train, and boat.

18. The vehicle according to claim 13, wherein the mechanical output of said hydraulic motor is coupled to at least one of a plurality of wheels, a train wheel set, and a propeller.

19. The vehicle according to claim 13, wherein said hydraulic charging station comprises a hydraulic pump coupled to a source of mechanical energy.

* * * * *